(12) United States Patent
Yang et al.

(10) Patent No.: US 11,205,367 B2
(45) Date of Patent: *Dec. 21, 2021

(54) DISPLAY PANEL WITH ADAPTIVE SUB-PIXEL ARRANGEMENT

(71) Applicant: Novatek Microelectronics Corp., Hsinchu (TW)

(72) Inventors: Hsueh-Yen Yang, Taoyuan (TW); Kai-Min Yang, Kaohsiung (TW); Feng-Ting Pai, Hsinchu (TW)

(73) Assignee: Novatek Microelectronics Corp., Hsinchu (TW)

( * ) Notice: Subject to any disclaimer, the term of this patent is extended or adjusted under 35 U.S.C. 154(b) by 0 days.

This patent is subject to a terminal disclaimer.

(21) Appl. No.: 16/507,055

(22) Filed: Jul. 10, 2019

(65) Prior Publication Data

US 2019/0333437 A1 Oct. 31, 2019

Related U.S. Application Data

(63) Continuation of application No. 14/672,245, filed on Mar. 30, 2015, now Pat. No. 10,395,576.

(30) Foreign Application Priority Data

Dec. 29, 2014 (TW) ................................ 103146054

(51) Int. Cl.
*G02F 1/1335* (2006.01)
*G09G 3/20* (2006.01)
*G09G 3/36* (2006.01)

(52) U.S. Cl.
CPC .......... *G09G 3/2003* (2013.01); *G09G 3/3607* (2013.01); *G02F 1/133514* (2013.01); *G02F 2201/52* (2013.01); *G09G 2300/0452* (2013.01)

(58) Field of Classification Search
CPC ........... G02F 1/133514; G02F 2201/52; G02F 1/133609; G02F 1/133621; G09G 3/2003; G09G 3/3607; G09G 2300/0452; G09G 3/2074; G09G 2320/0242; G09G 2340/06
See application file for complete search history.

(56) References Cited

U.S. PATENT DOCUMENTS

| 8,436,925 | B2* | 5/2013 | Hirota | ...................... G02B 5/20 |
| | | | | 348/279 |
| 2007/0159492 | A1* | 7/2007 | Lo | ........................... G09G 5/026 |
| | | | | 345/589 |
| 2009/0073099 | A1* | 3/2009 | Yeates | ................. H01L 27/3213 |
| | | | | 345/88 |
| 2015/0253476 | A1* | 9/2015 | Shao | ....................... G02B 5/201 |
| | | | | 359/891 |

* cited by examiner

*Primary Examiner* — Paisley L Wilson
(74) *Attorney, Agent, or Firm* — JCIPRNET

(57) ABSTRACT

A display panel including a plurality of sub-pixel repeating units is provided. The sub-pixel repeating units are repeatedly arranged on the display panel. Each of the sub-pixel repeating units includes at least one first color sub-pixel and at least one second color sub-pixel. On the display panel, the adjacent first color sub-pixels form a first polygon, and the adjacent second color sub-pixels form a second polygon. The area of the first polygon is at least twice the area of the second polygon.

7 Claims, 15 Drawing Sheets

DISPLAY PANEL WITH ADAPTIVE SUB-PIXEL ARRANGEMENT

CROSS-REFERENCE TO RELATED APPLICATION

This application is a continuation application of and claims the priority benefit of U.S. application Ser. No. 14/672,245, filed on Mar. 30, 2015, now allowed, which claims the priority benefit of Taiwan application serial no. 103146054, filed on Dec. 29, 2014. The entirety of each of the above-mentioned patent applications is hereby incorporated by reference herein and made a part of this specification.

BACKGROUND OF THE INVENTION

Field of the Invention

The invention relates to flat display technology and more particularly relates to a display panel that achieves favorable display effects with high resolution.

Description of Related Art

With the rapid development of display technology, the market shows growing demands for high resolution, high brightness, and low power consumption in terms of the performance of display panels. As the resolution of display panel increases, however, panel manufacturers may encounter the following issues. For example, due to the complexity of advanced pixel circuit, the number of thin film transistors in the layout may increase and occupy a certain layout area. For this reason, it is difficult to achieve high-resolution image display with the limited layout area. Furthermore, considering the fabrication conditions, whether the displays can achieve high resolution is also affected by the different design rules used in the fabrication of the displays or limited by the minimum safety distance of the fine metal mask. In terms of the performance of the displays, the increase of resolution would reduce the aperture ratio of the displays and cause the backlight transmittance to drop. Thus, it is necessary to increase the brightness of the backlight source to cope with the reduction of the aperture ratio, but it would increase power consumption instead.

In order to solve the aforementioned issues, a RGBW (red, green, blue, and white) display panel with improved backlight transmittance and lower backlight power consumption has been proposed in recent years. The RGBW display panel includes sub-pixels of four colors, i.e. red, green, blue, and white, and improves the brightness of the display panel by the high transmittance of the white sub-pixels. However, the white sub-pixels in the traditional RGBW display panel can only improve the transmittance of grayscale regions (e.g. the edge of an object in the image) in the image and cannot enhance the brightness of regions of pure colors (red, green, and blue). For the object in the displayed image, the brightness of the pure colors is not improved, but the grayscale edge is brighter. Therefore, the brightness of each part of the image may be enhanced inconsistently and result in poor display quality. For the object in the displayed image, when the brightness of the edge is enhanced excessively, abnormal display problems, such as white border near the edge, may also occur. Hence, how to design a display panel that achieves high resolution and prevents the abnormal display due to excessive enhancement of the brightness is an important issue that needs to be solved.

SUMMARY OF THE INVENTION

In view of the above, the invention provides a display panel that improves abnormal display due to excessive enhancement of brightness and achieves high resolution and favorable display effects.

The invention provides a display panel, including a plurality of sub-pixel repeating units. The sub-pixel repeating units are repeatedly arranged on the display panel. Each of the sub-pixel repeating units includes at least one first color sub-pixel and at least one second color sub-pixel. On the display panel, the adjacent first color sub-pixels form a first polygon, and the adjacent second color sub-pixels form a second polygon, wherein the area of the first polygon is at least twice as large as the area of the second polygon.

In an embodiment of the invention, the first polygon has a first symmetry axis and a second symmetry axis which respectively pass through a center of the first polygon, wherein the first symmetry axis and the second symmetry axis are perpendicular to each other and respectively parallel to arrangement directions of the sub-pixels on the display panel. The at least one first color sub-pixel that forms the first polygon is disposed symmetrically on two sides of the first symmetry axis and on two sides of the second symmetry axis.

In an embodiment of the invention, each of the sub-pixel repeating units further includes at least one third color sub-pixel and at least one fourth color sub-pixel, wherein the at least one first color sub-pixel, the at least one second color sub-pixel, the at least one third color sub-pixel, and the at least one fourth color sub-pixel are arranged in a plurality of rows and a plurality of columns in each of the sub-pixel repeating units.

In an embodiment of the invention, the at least one first color sub-pixel, the at least one second color sub-pixel, the at least one third color sub-pixel, and the at least one fourth color sub-pixel of each of the sub-pixel repeating units are arranged to form an array of four columns and four rows. A second column and a fourth column of each of the sub-pixel repeating units respectively include one first color sub-pixel and three third color sub-pixels, and a first column and a third column of each of the sub-pixel repeating units respectively include two second color sub-pixels and two fourth color sub-pixels. The second color sub-pixels and the fourth color sub-pixels in the first column are alternately arranged and the second color sub-pixels and the fourth color sub-pixels in the third column are alternately arranged, and the second color sub-pixels and the fourth color sub-pixels are arranged in different sequences in the first column and the third column.

In an embodiment of the invention, the sub-pixel repeating units include a first sub-pixel repeating unit, a second sub-pixel repeating unit, and a third sub-pixel repeating unit, wherein the first sub-pixel repeating unit is located between the second sub-pixel repeating unit and the third sub-pixel repeating unit, and the first, the second, and the third sub-pixel repeating units are arranged in an L shape. Two first color sub-pixels in the first sub-pixel repeating unit, one first color sub-pixel in the second sub-pixel repeating unit, and one first color sub-pixel in the third sub-pixel repeating unit form a first rhombus to obtain the first polygon, and three second color sub-pixels in the first sub-pixel repeating unit and one second color sub-pixel in the second sub-pixel repeating unit form a second rhombus to obtain the second polygon.

In an embodiment of the invention, the at least one first color sub-pixel, the at least one second color sub-pixel, the at least one third color sub-pixel, and the at least one fourth color sub-pixel of each of the sub-pixel repeating units are arranged to form an array of eight columns and two rows. A fourth column and an eighth column of each of the sub-pixel repeating units respectively include one first color sub-pixel and one third color sub-pixel, and the first color sub-pixel and the third color sub-pixel are arranged in different sequences in the fourth column and the eighth column. A first column and a third column of each of the sub-pixel repeating units respectively include one second color sub-pixel and one fourth color sub-pixel, and the second color sub-pixel and the fourth color sub-pixel are arranged in different sequences in the first column and the third column. A second column of each of the sub-pixel repeating units includes two third color sub-pixels, and the sub-pixels in a fifth column, a sixth column, and a seventh column of each of the sub-pixel repeating units are arranged in the same sequence as the sub-pixels in the first column, the second column, and the third column.

In an embodiment of the invention, the sub-pixel repeating units include a first sub-pixel repeating unit, a second sub-pixel repeating unit, and a third sub-pixel repeating unit, wherein the first sub-pixel repeating unit is located between the second sub-pixel repeating unit and the third sub-pixel repeating unit, and the first, the second, and the third sub-pixel repeating units are arranged in an L shape. Two first color sub-pixels in the first sub-pixel repeating unit, one first color sub-pixel in the second sub-pixel repeating unit, and one first color sub-pixel in the third sub-pixel repeating unit form a first rhombus to obtain the first polygon, and three second color sub-pixels in the first sub-pixel repeating unit and one second color sub-pixel in the second sub-pixel repeating unit form a second rhombus to obtain the second polygon.

In an embodiment of the invention, the at least one first color sub-pixel, the at least one second color sub-pixel, the at least one third color sub-pixel, and the at least one fourth color sub-pixel of each of the sub-pixel repeating units are arranged to form an array of four columns and two rows. A fourth column of each of the sub-pixel repeating units includes one first color sub-pixel and one third color sub-pixel, and a first column and third column of each of the sub-pixel repeating units respectively include one second color sub-pixel and one fourth color sub-pixel, wherein the second color sub-pixel and the fourth color sub-pixel are arranged in different sequences in the first column and the third column, and a second column of each of the sub-pixel repeating units includes two third color sub-pixels.

In an embodiment of the invention, the sub-pixel repeating units include a first sub-pixel repeating unit, a second sub-pixel repeating unit, a third sub-pixel repeating unit, and a fourth sub-pixel repeating unit, wherein the first, the second, the third, and the fourth sub-pixel repeating units are arranged to form a rectangle, and the first sub-pixel repeating unit and the third sub-pixel repeating unit are arranged in a diagonal line of the rectangle while the second sub-pixel repeating unit and the fourth sub-pixel repeating unit are arranged in the other diagonal line of the rectangle. The first color sub-pixels in the first, the second, the third, and the fourth sub-pixel repeating units form the first polygon, and two second color sub-pixels in the first sub-pixel repeating unit, one second color sub-pixel in the second sub-pixel repeating unit, and one second color sub-pixel in the fourth sub-pixel repeating unit form a rhombus to obtain the second polygon.

In an embodiment of the invention, the at least one first color sub-pixel, the at least one second color sub-pixel, the at least one third color sub-pixel, and the at least one fourth color sub-pixel of each of the sub-pixel repeating units are arranged to form an array of four columns and four rows. A second column and a fourth column of each of the sub-pixel repeating units respectively include two first color sub-pixels and two third color sub-pixels. The first color sub-pixels in the second column are arranged adjacent to each other, the third color sub-pixels in the second column are arranged adjacent to each other, the first color sub-pixels in the fourth column are arranged adjacent to each other, and the third color sub-pixels in the fourth column are arranged adjacent to each other. The first color sub-pixels and the third color sub-pixels are arranged in different sequences in the second column and the fourth column. A first column and a third column of each of the sub-pixel repeating units respectively include two second color sub-pixels and two fourth color sub-pixels, wherein the second color sub-pixels and the fourth color sub-pixels in the first column are alternately arranged, the second color sub-pixels and the fourth color sub-pixels in the third column are alternately arranged, and the second color sub-pixels and the fourth color sub-pixels are arranged in different sequences in the first column and the third column.

In an embodiment of the invention, the sub-pixel repeating units include a first sub-pixel repeating unit, a second sub-pixel repeating unit, and a third sub-pixel repeating unit, wherein the first sub-pixel repeating unit is located between the second sub-pixel repeating unit and the third sub-pixel repeating unit, and the first, the second, and the third sub-pixel repeating units are arranged in an L shape. Three first color sub-pixels in the first sub-pixel repeating unit, two first color sub-pixels in the second sub-pixel repeating unit, and one first color sub-pixel in the third sub-pixel repeating unit form a symmetrical hexagon to obtain the first polygon, and three second color sub-pixels in the first sub-pixel repeating unit and one second color sub-pixel in the second sub-pixel repeating unit form a rhombus to obtain the second polygon.

In an embodiment of the invention, the at least one first color sub-pixel, the at least one second color sub-pixel, the at least one third color sub-pixel, and the at least one fourth color sub-pixel of each of the sub-pixel repeating units are arranged to form an array of four columns and four rows. A second column and a fourth column of each of the sub-pixel repeating units respectively include one first color sub-pixel, one third color sub-pixel, and two fourth color sub-pixels, wherein the fourth color sub-pixels in the second column are arranged in alternate rows, the fourth color sub-pixels in the fourth column are arranged in alternate rows, the fourth color sub-pixels in the second column and the fourth column are in the same row, and the first color sub-pixels in the second column and the fourth column are in different rows. A first column and a third column of each of the sub-pixel repeating units respectively include two second color sub-pixels and two third color sub-pixels, wherein the second color sub-pixels and the third color sub-pixels in the first column are alternately arranged, and the second color sub-pixels and the third color sub-pixels in the third column are alternately arranged.

In an embodiment of the invention, the sub-pixel repeating units include a first sub-pixel repeating unit, a second sub-pixel repeating unit, and a third sub-pixel repeating unit, wherein the first sub-pixel repeating unit is located between the second sub-pixel repeating unit and the third sub-pixel repeating unit, and the first, the second, and the third sub-pixel repeating units are arranged in an L shape. Two first color sub-pixels in the first sub-pixel repeating unit, one first color sub-pixel in the second sub-pixel repeating unit, and one first color sub-pixel in the third sub-pixel repeating unit form a rhombus to obtain the first polygon, and the second color sub-pixels in the first sub-pixel repeating unit form a rectangle to obtain the second polygon.

In an embodiment of the invention, the at least one first color sub-pixel, the at least one second color sub-pixel, the at least one third color sub-pixel, and the at least one fourth color sub-pixel of each of the sub-pixel repeating units are arranged to form an array of four columns and six rows, wherein a second column and a fourth column of each of the sub-pixel repeating units respectively include one first color sub-pixel and five third color sub-pixels, and the two first color sub-pixels in the second column and the fourth column are in different rows, and wherein a first column and a third column of each of the sub-pixel repeating units respectively include three second color sub-pixels and three third color sub-pixels, wherein the second color sub-pixels and the fourth color sub-pixels in the first column are alternately arranged, the second color sub-pixels and the fourth color sub-pixels in the third column are alternately arranged, and the second color sub-pixels and the fourth color sub-pixels are arranged in different sequences in the first column and the third column.

In an embodiment of the invention, the sub-pixel repeating units include a first sub-pixel repeating unit, a second sub-pixel repeating unit, and a third sub-pixel repeating unit, wherein the first sub-pixel repeating unit is located between the second sub-pixel repeating unit and the third sub-pixel repeating unit, and the first, the second, and the third sub-pixel repeating units are arranged in an L shape, wherein two first color sub-pixels in the first sub-pixel repeating unit, one first color sub-pixel in the second sub-pixel repeating unit, and one first color sub-pixel in the third sub-pixel repeating unit form a first rhombus to obtain the first polygon, and three second color sub-pixels in the first sub-pixel repeating unit and one second color sub-pixel in the second sub-pixel repeating unit form a second rhombus to obtain the second polygon.

In an embodiment of the invention, the second color sub-pixels on the display panel are not adjacent to each other in any column.

In an embodiment of the invention, the first color sub-pixel is a white sub-pixel, the second color sub-pixel is a red sub-pixel, the third color sub-pixel is a green sub-pixel, and the fourth color sub-pixel is a blue sub-pixel.

In an embodiment of the invention, the first polygon includes a quadrangle and a hexagon, and the second polygon includes a quadrangle.

In an embodiment of the invention, a resolution of the second color sub-pixel is at least twice a resolution of the first color sub-pixel.

Based on the above, the display panel disclosed by the embodiments of the invention adaptively arranges the distribution of white sub-pixels thereon to adjust the increase of brightness of each part of the image, so as to improve abnormal display problems, such as white border caused by excessive enhancement of the brightness. According to the embodiments of the invention, the white sub-pixels are used to effectively enhance the display brightness as well as avoid abnormal display, thereby achieving the design of high resolution and favorable display effects.

To make the aforementioned and other features and advantages of the invention more comprehensible, several embodiments accompanied with drawings are described in detail as follows.

BRIEF DESCRIPTION OF THE DRAWINGS

The accompanying drawings are included to provide a further understanding of the invention, and are incorporated in and constitute a part of this specification. The drawings illustrate exemplary embodiments of the invention and, together with the description, serve to explain the principles of the invention.

DESCRIPTION OF THE EMBODIMENTS

An embodiment of the invention provides a display panel, which uses white sub-pixels to enhance display brightness and adaptively adjusts configuration of the white sub-pixels on the display panel by designing an arranging frequency of the white sub-pixels in each column, such that the area of a polygon surrounded by adjacent white sub-pixels is at least twice as large as the area of a polygon surrounded by sub-pixels of other colors. In other words, the adjacent white sub-pixels may be relatively dispersed. Based on the aforementioned concept, the embodiment of the invention utilizes sub-pixel rendering (SPR) technology in combination with different arrangements and designs of sub-pixels to improve abnormal display problems, such as white border that may occur on the edge of an object in the displayed image, thereby achieving a design that is applicable to high resolution and has favorable display effects.

Figure 1:
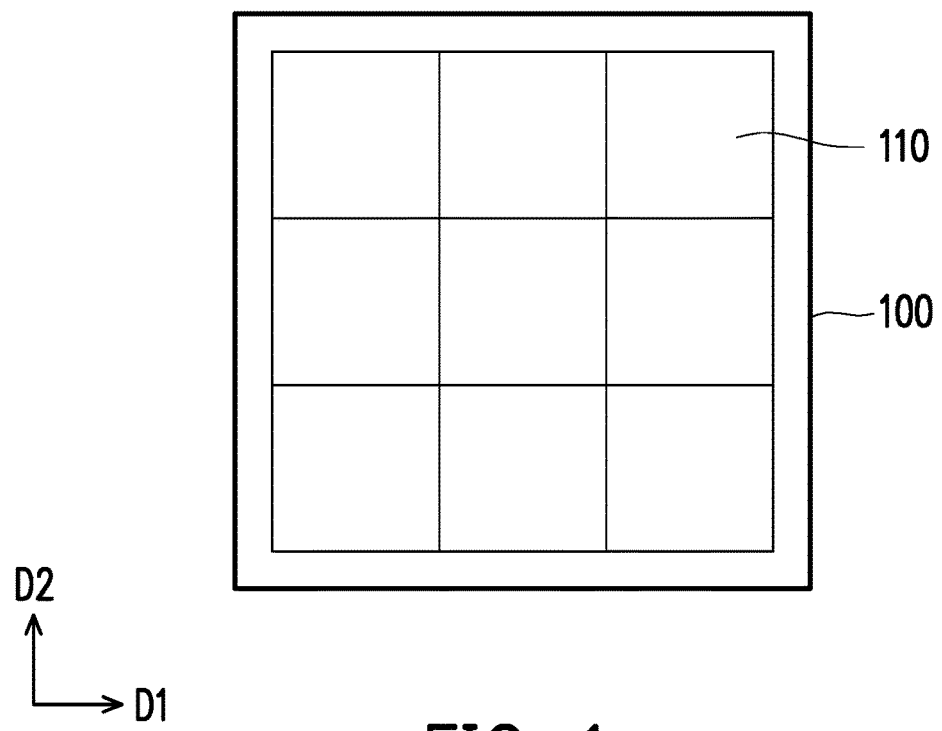
FIG. 1 is a schematic top view of the display panel according to an embodiment of the invention.

FIG. 1 is a schematic top view of the display panel according to an embodiment of the invention. A display panel 100 is a liquid crystal display panel, an organic electroluminescent display panel, an electrophoretic display panel, or other suitable display panels, for example. The display panel 100 includes a plurality of sub-pixel repeating units 110. The sub-pixel repeating units 110 are repeatedly arranged on the display panel 100. The sub-pixel repeating units 110 are arranged along a first direction D1 and a second direction D2 to form a matrix array having a plurality of columns and a plurality of rows, for example. However, it should be noted that the invention is not limited thereto. The columns and rows of the aforementioned array are merely for describing the relative positions of the arrangement in the array. In other words, the columns and rows of the array may be reversed to obtain an array equivalent to the original array turned 90 degrees. In addition, the invention is not intended to limit the number of the columns and the rows and the arrangement directions thereof (i.e. the first direction D1 and the second direction D2), which may be adjusted according to the design requirements.

Each sub-pixel repeating unit 110 of the display panel 100 includes a plurality of sub-pixels. When describing a layout size of the sub-pixel based on a pixel pitch P as a unit, in this embodiment, a length of each sub-pixel in the first direction D1 is ½ P and a length of each sub-pixel in the second direction D2 is P, for example. Alternatively, each sub-pixel may have the same length in the first direction D1 and the second direction D2 (both are P, for example). Nevertheless, the invention is not limited thereto. It should also be mentioned that the pixel pitch P may correspondingly determine the resolution of the display panel 100. For example, if the pixel pitch P is 84 um, the resolution is 303 PPI (pixel per inch, that is, the number of pixel structures in each inch), and if the pixel pitch P is 58 um, the resolution is 440 PPI.

The sub-pixels may correspond to different display wavelengths to display different colors. In this embodiment, each sub-pixel repeating unit 110 includes at least one first color sub-pixel, at least one second color sub-pixel, at least one third color sub-pixel, and at least one fourth color sub-pixel, for example. In each sub-pixel repeating unit 110, the first, second, third, and fourth color sub-pixels are arranged in the first direction D1 and the second direction D2 to form a plurality of rows and a plurality of columns, for example. In the following descriptions, the first, second, third, and fourth color sub-pixels are white sub-pixels, red sub-pixels, green sub-pixels, and blue sub-pixels, for example. It should be noted that, in other embodiments, the second, third, and fourth color sub-pixels may be reversed or may have other suitable colors or combinations. Nevertheless, the invention is not limited thereto.

In addition, if the display panel 100 of the invention is an organic electroluminescent display panel, the first, second, third, and fourth color sub-pixels are sub-pixel structures of the organic electroluminescent display panel, which include elements, such as a scan line, a data line, a power line, an active device, a cathode layer, an organic light-emitting layer, and an anode layer. If the display panel 100 of the invention is an electrophoretic display panel, the first, second, third, and fourth color sub-pixels are sub-pixel structures of the electrophoretic display panel, which include elements, such as a scan line, a data line, an active device, a pixel electrode, an electrophoretic display layer, and an opposite electrode. Further to the above, the invention is not intended to limit the type of the display panel 100. The structures of the first, second, third, and fourth color sub-pixels may vary according to the type of the display panel 100.

Based on the above, the configuration of the display panel 100 according to an embodiment of the invention is described in detail below.

In an embodiment, the adjacent first color sub-pixels (e.g. white sub-pixels) form a first polygon on the display panel 100, and the adjacent second color sub-pixels (e.g. red sub-pixels, or blue or green sub-pixels) form a second polygon, wherein the area of the first polygon is at least twice as large as the area of the second polygon. The area of the first polygon and the area of the second polygon are respectively related to the pixel pitch P and thus correspondingly determine the resolutions of the first color sub-pixels and the second color sub-pixels on the display panel 100. Therefore, in contrast to a general display panel configuration that uniformly disposes the sub-pixels of different colors, this embodiment adjusts the configuration of the first color sub-pixels on the display panel 100 to relatively disperse the adjacent first color sub-pixels, so as to increase the area of the first polygon. Thereby, the first color sub-pixels improve the problem of excessive enhancement of brightness of a specific region in the image and prevent abnormal display to achieve favorable display effects.

Hereinafter, the arrangement of each sub-pixel in the sub-pixel repeating unit 110 is described in detail with reference to the embodiments of FIG. 2A and FIG. 2B.

Figure 2A:
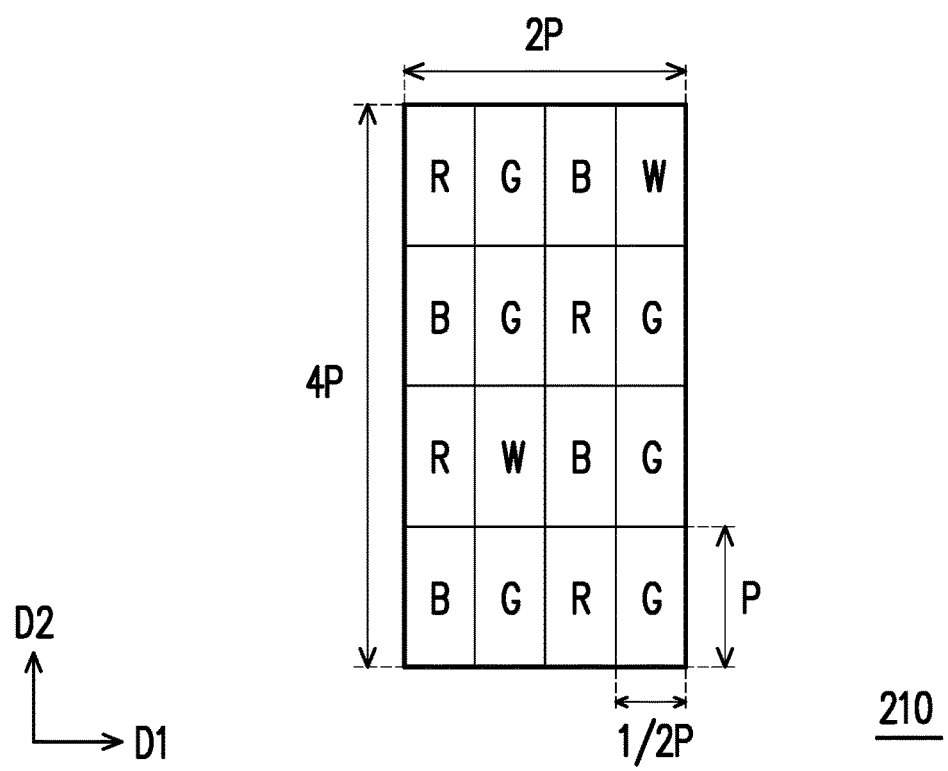
FIG. 2A is a schematic top view of the sub-pixel repeating unit according to an embodiment of the invention.

FIG. 2A is a schematic top view of the sub-pixel repeating unit according to an embodiment of the invention. FIG. 2B is a schematic top view of the display panel according to an embodiment of the invention. To make the illustration easily comprehensible, FIG. 2A merely shows a sub-pixel repeating unit 210 while FIG. 2B shows a region including four sub-pixel repeating units 210 of FIG. 2A (which are 210a, 210b, 210c, and 210d) on the display panel 100. Those skilled in the art should be able to understand that the display panel 100 in fact has an array composed of a plurality of the sub-pixel repeating units 210. Below the sub-pixel repeating unit 210 of FIG. 2A and the first, second, and third sub-pixel repeating units 210a, 210b, and 210c of FIG. 2B are described to explain details of this embodiment.

With reference to FIG. 2A, in this embodiment, the sub-pixel repeating unit 210 includes sixteen sub-pixels arranged in an array of four columns and four rows (4×4), which are two first color sub-pixels W, four second color sub-pixels R, six third color sub-pixels G, and four fourth color sub-pixels B. A length of each of the sub-pixels in the first direction D1 is ½ P and a length of each of the sub-pixels in the second direction D2 is P. In other words, in this embodiment, a length of the sub-pixel repeating unit 210 in the first direction D1 is 2 P and a length of the sub-pixel repeating unit 210 in the second direction D2 is 4 P.

A second column and a fourth column of the sub-pixel repeating unit 210 respectively include one first color sub-pixel W and three third color sub-pixels G, and a first column and a third column respectively include two second color sub-pixels R and two fourth color sub-pixels B. The second color sub-pixels R and the fourth color sub-pixels B are alternately arranged in the first column. The second color sub-pixels R and the fourth color sub-pixels B are alternately arranged in the third column. The second color sub-pixels R and the fourth color sub-pixels B are arranged in different sequences in the first column and the third column.

More specifically, with reference to FIG. 2A, the first column of the sub-pixel repeating unit 210 includes the second color sub-pixel R, the fourth color sub-pixel B, the second color sub-pixel R, and the fourth color sub-pixel B in sequence from top to bottom. The second column of the sub-pixel repeating unit 210 includes the third color sub-pixel G, the third color sub-pixel G, the first color sub-pixel W, and the third color sub-pixel G in sequence from top to bottom. The third column of the sub-pixel repeating unit 210 includes the fourth color sub-pixel B, the second color sub-pixel R, the fourth color sub-pixel B, and the second color sub-pixel R in sequence from top to bottom. The fourth column of the sub-pixel repeating unit 210 includes the first color sub-pixel W, the third color sub-pixel G, the third color sub-pixel G, and the third color sub-pixel G in sequence from top to bottom.

It is worth mentioning that, in the second column and the fourth column of the sub-pixel repeating unit 210, the arranging frequency of the first color sub-pixel W and the third color sub-pixel G is 1:3, and the arrangement sequence of the first color sub-pixel W and the third color sub-pixel G can be adjusted adaptively. Moreover, the first column and the third column of the sub-pixel repeating unit 210 may be reversed. In particular, the second color sub-pixels R and the fourth color sub-pixels B are arranged in alternate columns or alternate rows in the sub-pixel repeating unit 210 to form a checkerboard arrangement. With this arrangement, the second color sub-pixels R on the display panel 100 are not adjacent to each other in any column, and the fourth color sub-pixels B on the display panel 100 are not adjacent to each other in any column either.

Based on the arrangement of the sub-pixel repeating unit 210, how to obtain the first polygon and the second polygon are described in detail hereinafter. With reference to FIG. 2B, on the display panel 100, the first sub-pixel repeating unit 210a is located between the second sub-pixel repeating unit 210b and the third sub-pixel repeating unit 210c. The first, second, and third sub-pixel repeating units 210a, 210b, and 210c are arranged in an L shape.

In this embodiment, two first color sub-pixels W in the first sub-pixel repeating unit 210a, one first color sub-pixel W in the second sub-pixel repeating unit 210b, and one first color sub-pixel W in the third sub-pixel repeating unit 210c form a first rhombus, so as to obtain a first polygon 212. In addition, three second color sub-pixels R in the first sub-pixel repeating unit 210a and one second color sub-pixel R in the second sub-pixel repeating unit 210b form a second rhombus, so as to obtain a second polygon 214.

Figure 2B:
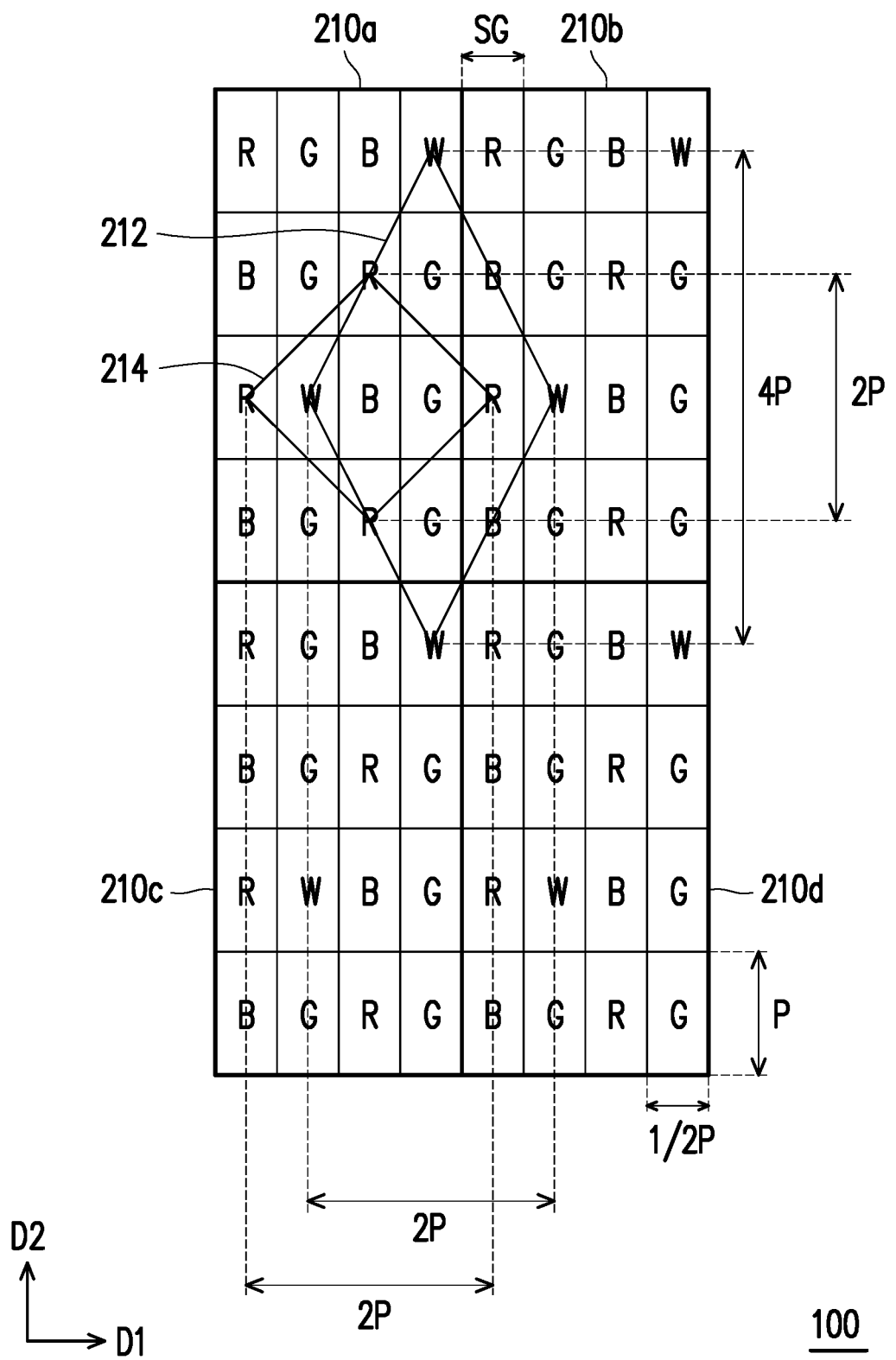
FIG. 2B is a schematic top view of the display panel according to an embodiment of the invention.

Specifically, in the embodiment of FIG. 2B, the first polygon 212 is composed of two first color sub-pixels W respectively in the second column and the third row and in the fourth column and the first row of the first sub-pixel repeating unit 210a, one first color sub-pixel W in the second column and the third row of the second sub-pixel repeating unit 210b, and one first color sub-pixel W in the fourth column and the first row of the third sub-pixel repeating unit 210c. More specifically, in this embodiment, a center point of each of the first color sub-pixels W serves as a vertex of the first polygon 212 respectively. With this configuration, the area of the first polygon 212 is 4 $P^2$, obtained through calculation.

Further, the second polygon 214 is composed of three second color sub-pixels R respectively in the first column and the third row, in the third column and the second row, and in the third column and the fourth row of the first sub-pixel repeating unit 210a and one second color sub-pixel R in the first column and the third row of the second sub-pixel repeating unit 210b. Likewise, a center point of each of the second color sub-pixels R serves as a vertex of the second polygon 214, and through calculation, the area of the second polygon 214 is 2 $P^2$. Based on the above, in this embodiment, the area of the first polygon 212 is twice as large as the area of the second polygon 214.

Moreover, in other embodiments, because the fourth color sub-pixels B and the second color sub-pixels R have similar arrangements, the second polygon 214 and the area thereof can also be obtained based on the adjacent fourth color sub-pixels B. Details have been specified in the above embodiment and thus are not repeated hereinafter.

Due to the arrangement of the sub-pixels in the sub-pixel repeating unit 210, the first color sub-pixels W are relatively dispersed on the display panel 100 in terms of configuration density. More specifically, based on the ratio of the areas of the first polygon 212 and the second polygon 214, if the resolution of the second color sub-pixels R, the third color sub-pixels G, or the third color sub-pixels B is designed as 800 PPI, the resolution of the first color sub-pixels W is only 400 PPI on the display panel 100 of this embodiment. In other words, from another aspect, the resolution of the second color sub-pixels R on the display panel 100 is designed to be at least twice the resolution of the first color sub-pixels W in this embodiment. Therefore, excessive enhancement of the brightness of a specific region in the image caused by the first color sub-pixels W is prevented to improve abnormal display, such as white border that occurs on the edge of an object in the image.

It should also be noted that, in the embodiment of FIG. 2B, a slit gap SG between two first color sub-pixels W in alternate columns (e.g. the first color sub-pixel W in the fourth column and the first row of the first sub-pixel repeating unit 210a and the first color sub-pixel W in the second column and the third row of the second sub-pixel repeating unit 210b) in the first direction D1 is ½ P. As described above, the pixel pitch P is related to the resolution of the display panel 100. Therefore, the slit gap SG between the first color sub-pixels W also determines the resolution applicable to the display panel 100 of this embodiment. For example, if the slit gap SG is designed to be less than 42 um, the resolution of the display panel 100 needs to be 400 PPI or more. In other words, the display panel 100 of this embodiment is applicable for high resolution, and even though the first color sub-pixels W on the display panel 100 are relatively dispersed, the viewer would not notice it when watching the image displayed by the display panel 100. Thus, this embodiment is applicable to the design of high resolution and achieves favorable visual image resolution.

Descriptions are provided below to explain other embodiments of the sub-pixel repeating unit of the invention. FIG. 3A to FIG. 6A are schematic top views of some other sub-pixel repeating units according to an embodiment of the invention. FIG. 3B to FIG. 6B are schematic top views of display panels according to an embodiment of the invention, which are respectively formed by repeatedly arranging the sub-pixel repeating units of FIG. 3A to FIG. 6A. In FIG. 3A to FIG. 6A, details of elements the same as or similar to the previous embodiment are not repeated hereinafter. The arrangement of sub-pixels in each sub-pixel repeating unit of the embodiment of the invention is described below with reference to the respective figure.

Figure 3A:
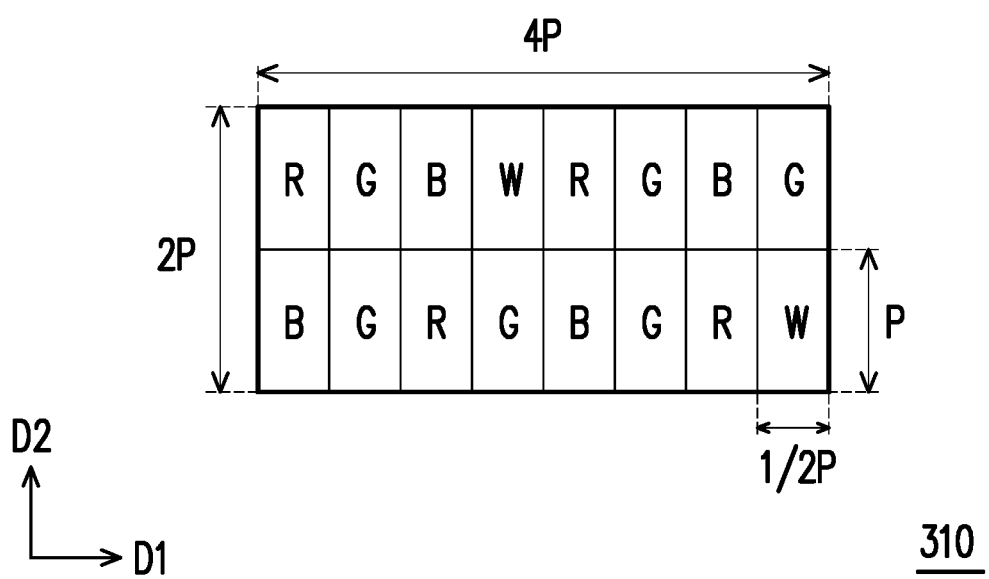
FIG. 3A is a schematic top view of the sub-pixel repeating unit according to an embodiment of the invention.

First, with reference to FIG. 3A, a sub-pixel repeating unit 310 includes sixteen sub-pixels arranged in an array of eight columns and two rows (8×2), which are two first color sub-pixels W, four second color sub-pixels R, six third color sub-pixels G, and four fourth color sub-pixels B. A length of each of the sub-pixels in the first direction D1 is ½ P and a length of each of the sub-pixels in the second direction D2 is P, for example. In other words, in this embodiment, a length of the sub-pixel repeating unit 310 in the first direction D1 is 4 P and a length of the sub-pixel repeating unit 310 in the second direction D2 is 2 P, for example.

In the sub-pixel repeating unit 310 of FIG. 3A, a fourth column and an eighth column respectively include one first color sub-pixel W and one third color sub-pixel G, and the first color sub-pixel W and the third color sub-pixel G are arranged in different sequences in the fourth column and the eighth column. A first column and a third column of the sub-pixel repeating unit 310 respectively include one second color sub-pixel R and one fourth color sub-pixel B, and the second color sub-pixel R and the fourth color sub-pixel B are arranged in different sequences in the first column and the third column. A second column of the sub-pixel repeating unit 310 includes two third color sub-pixels G. Moreover, the sub-pixels in the fifth, sixth, and seventh columns of the sub-pixel repeating unit 310 are respectively arranged in the same sequences as the sub-pixels in the first, second, and third columns.

More specifically, with reference to FIG. 3A, in the sub-pixel repeating unit 310, the first column includes one second color sub-pixel R and one fourth color sub-pixel B in sequence from top to bottom, the second column includes two third color sub-pixels G from top to bottom, the third column includes one fourth color sub-pixel B and one second color sub-pixel R in sequence from top to bottom, the fourth column includes one first color sub-pixel W and one third color sub-pixel G in sequence from top to bottom, the fifth column includes one second color sub-pixel R and one fourth color sub-pixel B in sequence from top to bottom, the sixth column includes two third color sub-pixels G from top to bottom, the seventh column includes one fourth color sub-pixel B and one second color sub-pixel R in sequence from top to bottom, and the eighth column includes one third color sub-pixel G and one first color sub-pixel W in sequence from top to bottom.

It is worth mentioning that, in the fourth column and the eighth column of the sub-pixel repeating unit 310, the arranging frequency of the first color sub-pixel W and the third color sub-pixel G is 1:1, and the arrangement sequence of the first color sub-pixel W and the third color sub-pixel G can be adjusted adaptively. In the sub-pixel repeating unit 310, the fourth column and the second column may be reversed, and the eighth column and the sixth column may be reversed. In addition, the first column and the third column may be reversed, and the fifth column and the seventh column may be reversed. However, it should be noted that the invention is not limited to the aforementioned various arrangements. In particular, similar to the previous embodiment, the second color sub-pixels R and the fourth color sub-pixels B are arranged in alternate columns or alternate rows in the sub-pixel repeating unit 310 to form a checkerboard arrangement.

Figure 3B:
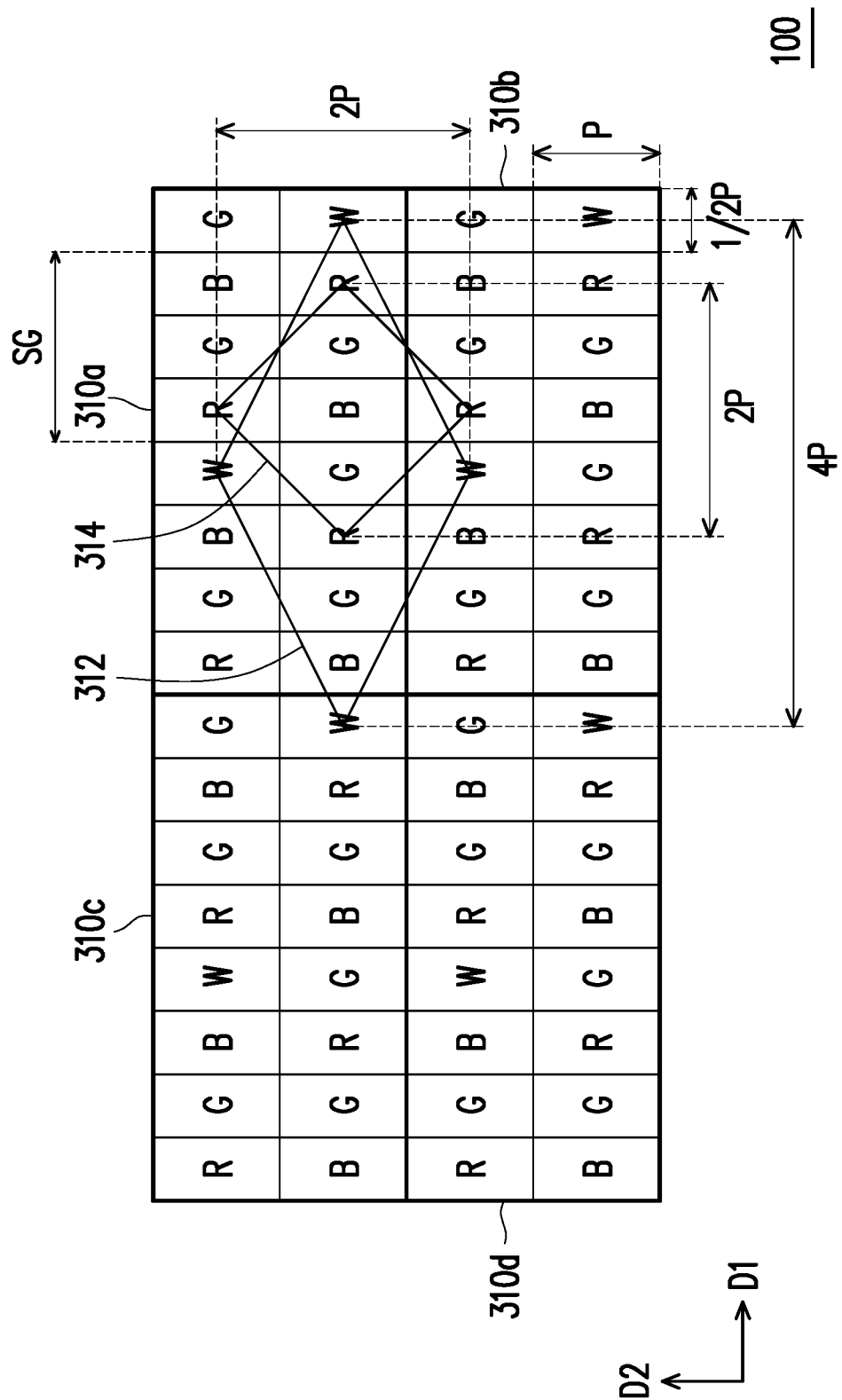
FIG. 3B is a schematic top view of the display panel according to an embodiment of the invention.

Based on the arrangement of the sub-pixel repeating unit 310, how to obtain the first polygon and the second polygon are described in detail hereinafter. FIG. 3B illustrates a region on the display panel 100 that includes four sub-pixel repeating units 310 of FIG. 3A (which are 310a, 310b, 310c, and 310d). Below the first, second, and third sub-pixel repeating units 310a, 310b, and 310c are described to explain details of this embodiment. The first sub-pixel repeating unit 310a is located between the second sub-pixel repeating unit 310b and the third sub-pixel repeating unit 310c. The first, second, and third sub-pixel repeating units 310a, 310b, and 310c are arranged in an L shape.

In this embodiment, two first color sub-pixels W in the first sub-pixel repeating unit 310a, one first color sub-pixel W in the second sub-pixel repeating unit 310b, and one first color sub-pixel W in the third sub-pixel repeating unit 310c form a first rhombus, so as to obtain a first polygon 312. In addition, three second color sub-pixels R in the first sub-pixel repeating unit 310a and one second color sub-pixel R in the second sub-pixel repeating unit 310b form a second rhombus, so as to obtain a second polygon 314.

Specifically, in the embodiment of FIG. 3B, the first polygon 312 is composed of two first color sub-pixels W respectively in the fourth column and the first row and in the eighth column and the second row of the first sub-pixel repeating unit 310a, one first color sub-pixel W in the fourth column and the first row of the second sub-pixel repeating unit 310b, and one first color sub-pixel W in the eighth column and the second row of the third sub-pixel repeating unit 310c. Similarly, in this embodiment, the center point of each of the first color sub-pixels W serves as a vertex of the first polygon 312 respectively. With this configuration, the area of the first polygon 312 is 4 $P^2$, obtained through calculation.

Further, the second polygon 314 is composed of three second color sub-pixels R respectively in the third column and the second row, in the fifth column and the first row, and in the seventh column and the second row of the first sub-pixel repeating unit 310a and one second color sub-pixel R in the fifth column and the first row of the second sub-pixel repeating unit 310b. Likewise, the center point of each of the second color sub-pixels R serves as a vertex of the second polygon 314, and through calculation, the area of the second polygon 314 is 2 $P^2$. Based on the above, in this embodiment, the area of the first polygon 312 is twice as large as the area of the second polygon 314.

It should also be noted that, in the embodiment of FIG. 3B, a slit gap SG between two first color sub-pixels W in alternate columns (e.g. two first color sub-pixels W in the fourth column and the first row and in the eighth column and the second row of the first sub-pixel repeating unit 310a) in the first direction D1 is 1.5 P. As described above, the slit gap SG may determine the resolution applicable to the display panel 100 of this embodiment. Thus, if the slit gap SG is designed to be 48 um or less, the resolution of the display panel 100 needs to be 700 PPI or more.

Figure 4A:
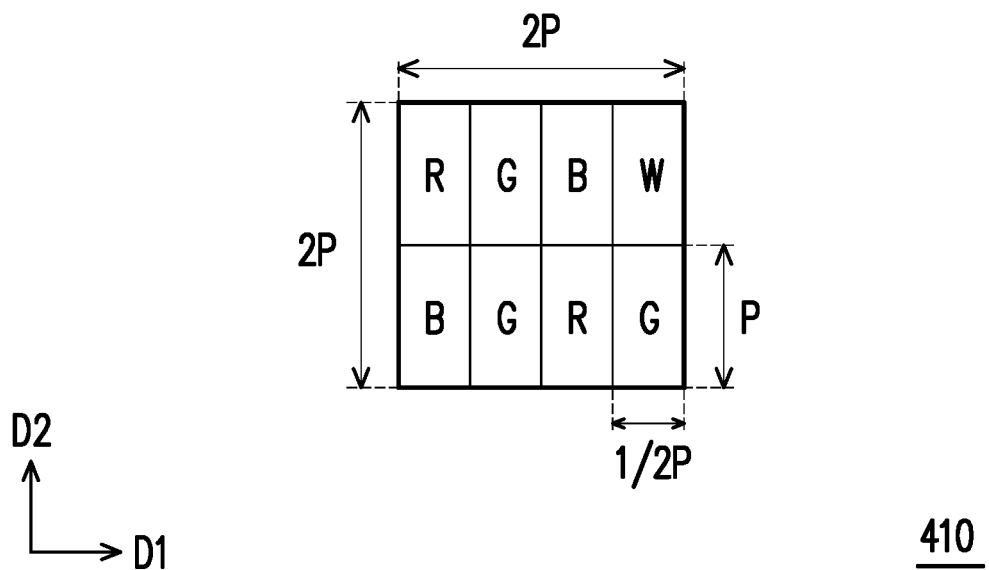
FIG. 4A is a schematic top view of the sub-pixel repeating unit according to an embodiment of the invention.

FIG. 4A illustrates another embodiment of the sub-pixel repeating unit. With reference to FIG. 4A, a sub-pixel repeating unit 410 includes eight sub-pixels arranged in an array of four columns and two rows (4×2), which are one first color sub-pixel W, two second color sub-pixels R, three third color sub-pixels G, and two fourth color sub-pixels B. A length of each of the sub-pixels in the first direction D1 is ½ P and a length of each of the sub-pixels in the second direction D2 is P, for example. In other words, in this embodiment, a length of the sub-pixel repeating unit 410 in the first direction D1 is 2 P and a length of the sub-pixel repeating unit 410 in the second direction D2 is 2 P, for example.

In the sub-pixel repeating unit 410 of FIG. 4A, a fourth column includes one first color sub-pixel W and one third color sub-pixel G. A first column and a third column of the sub-pixel repeating unit 410 respectively include one second color sub-pixel R and one fourth color sub-pixel B, and the second color sub-pixel R and the fourth color sub-pixel B are arranged in different sequences in the first column and the third column. In addition, a second column of the sub-pixel repeating unit 410 includes two third color sub-pixels G.

More specifically, with reference to FIG. 4A, in the sub-pixel repeating unit 410, the first column includes one second color sub-pixel R and one fourth color sub-pixel B in sequence from top to bottom, the second column includes two third color sub-pixels G from top to bottom, the third column includes one fourth color sub-pixel B and one second color sub-pixel R in sequence from top to bottom, and the fourth column includes one first color sub-pixel W and one third color sub-pixel G in sequence from top to bottom.

It is worth mentioning that, in the fourth column of the sub-pixel repeating unit 410, the arranging frequency of the first color sub-pixel W and the third color sub-pixel G is 1:1, and the arrangement sequence of the first color sub-pixel W and the third color sub-pixel G can be adjusted adaptively. In the sub-pixel repeating unit 410, the fourth column and the second column may be reversed. Moreover, the first column and the third column may also be reversed. However, it should be noted that the invention is not limited to the aforementioned various arrangements. In particular, similar to the previous embodiment, the second color sub-pixels R and the fourth color sub-pixels B are arranged in alternate columns or alternate rows in the sub-pixel repeating unit 410 to form a checkerboard arrangement.

Figure 4B:
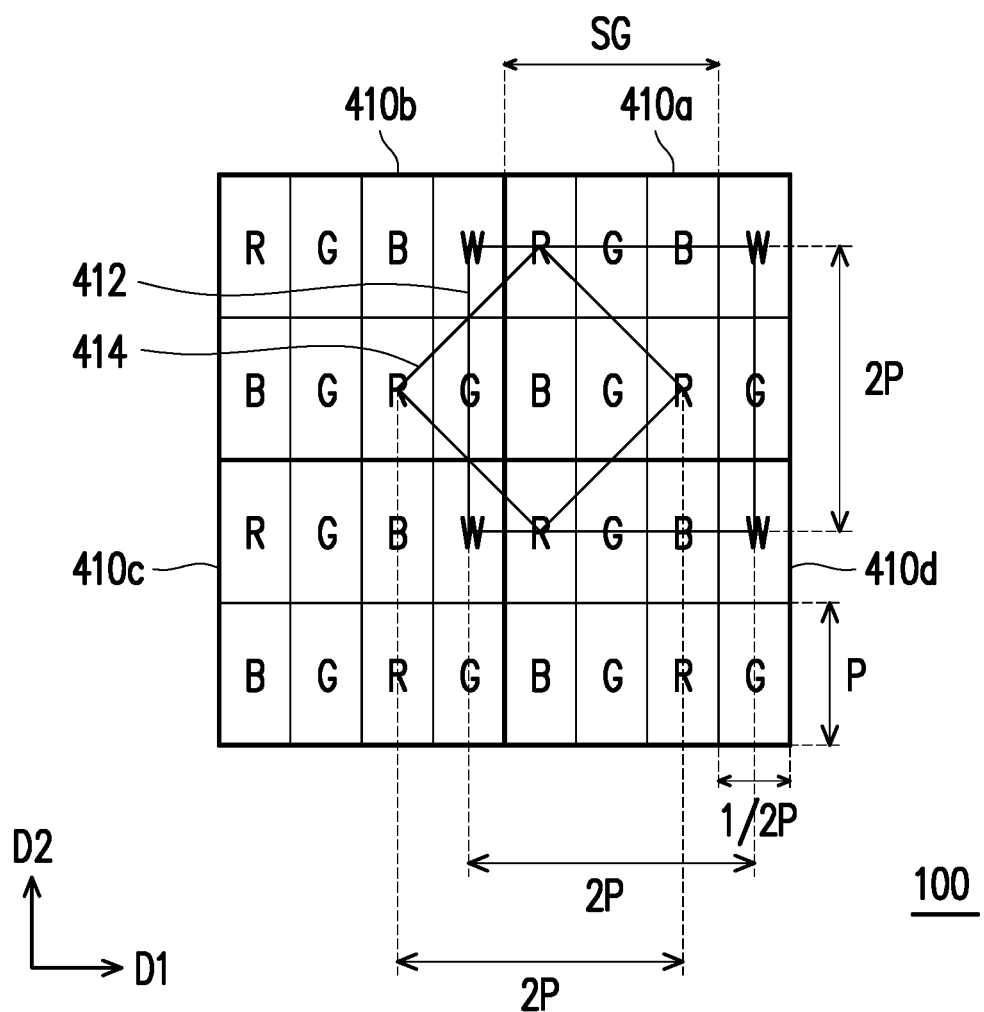
FIG. 4B is a schematic top view of the display panel according to an embodiment of the invention.

Based on the arrangement of the sub-pixel repeating unit 410, how to obtain the first polygon and the second polygon are described in detail hereinafter. FIG. 4B illustrates a region on the display panel 100 that includes four sub-pixel repeating units 410 of FIG. 4A (which are 410a, 410b, 410c, and 410d). Below the first, second, third, and fourth sub-pixel repeating units 410a, 410b, 410c, and 410d are described to explain details of this embodiment. The first, second, third, and fourth sub-pixel repeating units 410a, 410b, 410c, and 410d are arranged to form a rectangle, wherein the first and third sub-pixel repeating units 410a and 410c are arranged in a diagonal line while the second and fourth sub-pixel repeating units 410b and 410d are arranged in the other diagonal line in the rectangle.

In this embodiment, four first color sub-pixels W respectively in the first, second, third, and fourth sub-pixel repeating units 410a, 410b, 410c, and 410d form a first polygon 412. In addition, two second color sub-pixels R in the first sub-pixel repeating unit 410a, one second color sub-pixel R in the second sub-pixel repeating unit 410b, and one second color sub-pixel R in the fourth sub-pixel repeating unit 410d form a rhombus, so as to obtain a second polygon 414.

Specifically, in the embodiment of FIG. 4B, the first polygon 412 is composed of one first color sub-pixel W in the fourth column and the first row of the first sub-pixel repeating unit 410a, one first color sub-pixel W in the fourth column and the first row of the second sub-pixel repeating unit 410b, one first color sub-pixel W in the fourth column and the first row of the third sub-pixel repeating unit 410c, and one first color sub-pixel W in the fourth column and the first row of the fourth sub-pixel repeating unit 410d. Similarly, in this embodiment, the center point of each of the first color sub-pixels W serves as a vertex of the first polygon 412 respectively. With this configuration, the area of the first polygon 412 is 4 $P^2$, obtained through calculation.

In addition, the second polygon 414 is composed of two second color sub-pixels R respectively in the first column and the first row and in the third column and the second row of the first sub-pixel repeating unit 410a, one second color sub-pixel R in the third column and the second row of the second sub-pixel repeating unit 410b, and one second color sub-pixel R in the first column and the first row of the fourth sub-pixel repeating unit 410d. Likewise, the center point of each of the second color sub-pixels R serves as a vertex of the second polygon 414, and through calculation, the area of the second polygon 414 is 2 $P^2$. Based on the above, in this embodiment, the area of the first polygon 412 is twice as large as the area of the second polygon 414.

It should also be noted that, in the embodiment of FIG. 4B, a slit gap SG between two first color sub-pixels W in alternate columns (e.g. the first color sub-pixel W in the fourth column and the first row of the first sub-pixel repeating unit 410a and the first color sub-pixel W in the fourth column and the first row of the second sub-pixel repeating unit 410b) in the first direction D1 is 1.5 P. As described above, the slit gap SG may determine the resolution applicable to the display panel 100 of this embodiment. Thus, if the slit gap SG is designed to be 48 um or less, the resolution of the display panel 100 needs to be 700 PPI or more.

Figure 5A:
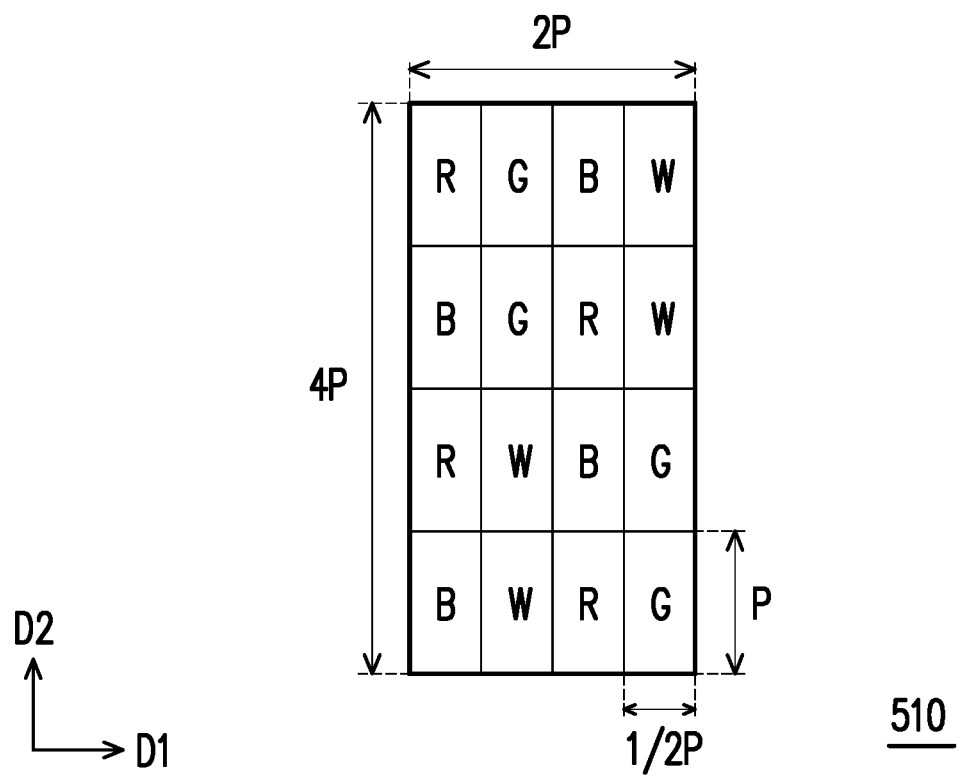
FIG. 5A is a schematic top view of the sub-pixel repeating unit according to an embodiment of the invention.

FIG. 5A illustrates another embodiment of the sub-pixel repeating unit. With reference to FIG. 5A, a sub-pixel repeating unit 510 includes sixteen sub-pixels arranged in an array of four columns and four rows (4×4), which are four first color sub-pixels W, four second color sub-pixels R, four third color sub-pixels G, and four fourth color sub-pixels B. A length of each of the sub-pixels in the first direction D1 is ½ P and a length of each of the sub-pixels in the second direction D2 is P, for example. In other words, in this embodiment, a length of the sub-pixel repeating unit 510 in the first direction D1 is 2 P and a length of the sub-pixel repeating unit 510 in the second direction D2 is 4 P, for example.

In the sub-pixel repeating unit 510 of FIG. 5A, a second column and a fourth column respectively include two first color sub-pixels W and two third color sub-pixels G. In the second column, the first color sub-pixels W are arranged adjacent to each other, and the third color sub-pixels G are arranged adjacent to each other. In the fourth column, the first color sub-pixels W are arranged adjacent to each other, and the third color sub-pixels G are arranged adjacent to each other. The first color sub-pixels W and the third color sub-pixels G are arranged in different sequences in the second column and the fourth column. A first column and a third column of the sub-pixel repeating unit 510 respectively include two second color sub-pixels R and two fourth color sub-pixels B. The second color sub-pixels R and the fourth color sub-pixels B are alternately arranged in the first column. The second color sub-pixels R and the fourth color sub-pixels B are alternately arranged in the third column. The second color sub-pixels R and the fourth color sub-pixels B are arranged in different sequences in the first column and the third column.

More specifically, with reference to FIG. 5A, the first column of the sub-pixel repeating unit 510 includes the second color sub-pixel R, the fourth color sub-pixel B, the second color sub-pixel R, and the fourth color sub-pixel B in sequence from top to bottom. The second column of the sub-pixel repeating unit 510 includes the third color sub-pixel G, the third color sub-pixel G, the first color sub-pixel W, and the first color sub-pixel W in sequence from top to bottom. The third column of the sub-pixel repeating unit 510 includes the fourth color sub-pixel B, the second color sub-pixel R, the fourth color sub-pixel B, and the second color sub-pixel R in sequence from top to bottom. The fourth column of the sub-pixel repeating unit 510 includes the first color sub-pixel W, the first color sub-pixel W, the third color sub-pixel G, and the third color sub-pixel G in sequence from top to bottom.

It is worth mentioning that, in the second column and the fourth column of the sub-pixel repeating unit 510, the arranging frequency of the first color sub-pixels W and the third color sub-pixels G is 2:2, and the second column and the fourth column may be reversed. Moreover, the first column and the third column of the sub-pixel repeating unit 510 may be reversed. Nevertheless, the invention is not limited thereto. In particular, similar to the previous embodiment, the second color sub-pixels R and the fourth color sub-pixels B are arranged in alternate columns or alternate rows in the sub-pixel repeating unit 510 to form a checkerboard arrangement.

Figure 5B:
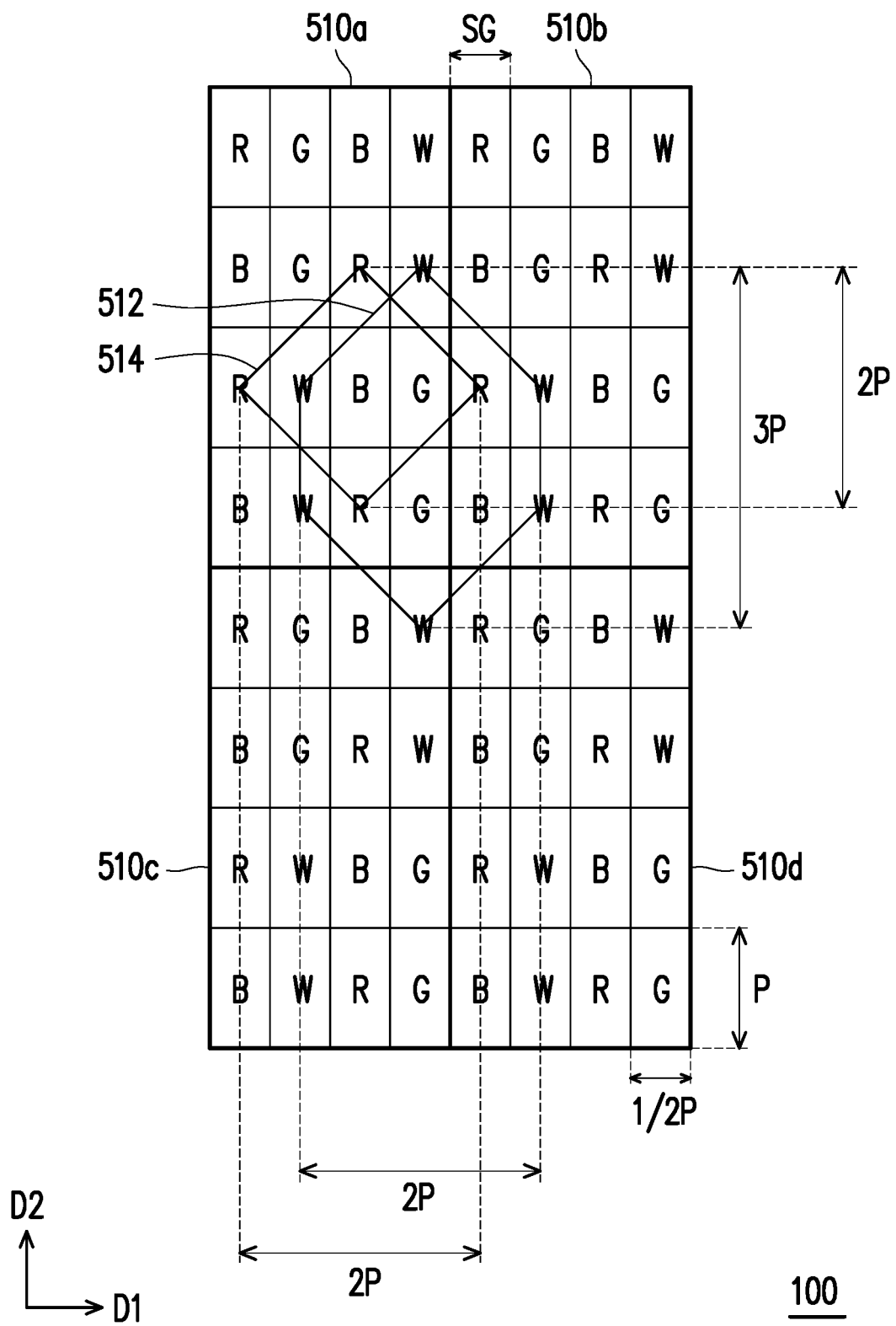
FIG. 5B is a schematic top view of the display panel according to an embodiment of the invention.

Based on the arrangement of the sub-pixel repeating unit 510, how to obtain the first polygon and the second polygon are described in detail hereinafter. FIG. 5B illustrates a region on the display panel 100 that includes four sub-pixel repeating units 510 of FIG. 5A (which are 510a, 510b, 510c, and 510d). Below the first, second, and third sub-pixel repeating units 510a, 510b, and 510c are described to explain details of this embodiment. The first sub-pixel repeating unit 510a is located between the second sub-pixel repeating unit 510b and the third sub-pixel repeating unit 510c. The first, second, and third sub-pixel repeating units 510a, 510b, and 510c are arranged in an L shape.

In this embodiment, three first color sub-pixels W in the first sub-pixel repeating unit 510a, two first color sub-pixels W in the second sub-pixel repeating unit 510b, and one first color sub-pixel W in the third sub-pixel repeating unit 510c form a symmetrical hexagon, so as to obtain a first polygon 512. In addition, three second color sub-pixels R in the first sub-pixel repeating unit 510a and one second color sub-pixel R in the second sub-pixel repeating unit 510b form a rhombus, so as to obtain a second polygon 514.

Specifically, in the embodiment of FIG. 5B, the first polygon 512 is composed of three first color sub-pixels W respectively in the second column and the third row, in the second column and the fourth row, and in the fourth column and the second row of the first sub-pixel repeating unit 510a, two first color sub-pixels W respectively in the second column and the third row and in the second column and the fourth row of the second sub-pixel repeating unit 510b, and one first color sub-pixel W in the fourth column and the first row of the third sub-pixel repeating unit 510c. Similarly, in this embodiment, the center point of each of the first color sub-pixels W serves as a vertex of the first polygon 512 respectively. With this configuration, the area of the first polygon 512 is 4 $P^2$, obtained through calculation.

Further, the second polygon 514 is composed of three second color sub-pixels R respectively in the first column and the third row, in the third column and the second row, and in the third column and the fourth row of the first sub-pixel repeating unit 510a and one second color sub-pixel R in the first column and the third row of the second sub-pixel repeating unit 510b. Likewise, the center point of each of the second color sub-pixels R serves as a vertex of the second polygon 514, and through calculation, the area of the second polygon 514 is 2 $P^2$. Based on the above, in this embodiment, the area of the first polygon 512 is twice as large as the area of the second polygon 514.

It should also be noted that, in the embodiment of FIG. 5B, a slit gap SG between two first color sub-pixels W in alternate columns (e.g. the first color sub-pixel W in the fourth column and the second row of the first sub-pixel repeating unit 510a and the first color sub-pixel W in the second column and the third row of the second sub-pixel repeating unit 510b) in the first direction D1 is ½ P. As described above, the slit gap SG may determine the resolution applicable to the display panel 100 of this embodiment. Thus, if the slit gap SG is designed to be 42 um or less, the resolution of the display panel 100 needs to be 440 PPI or more.

The sub-pixel repeating unit of the above embodiment may include a plurality of sub-pixels each having a length of ½ P in the first direction D1 and a length of P in the second direction D2. It should be noted that the display panel 100 of this embodiment is also applicable to sub-pixels of different sizes. Several embodiments are given below.

Figure 6A:
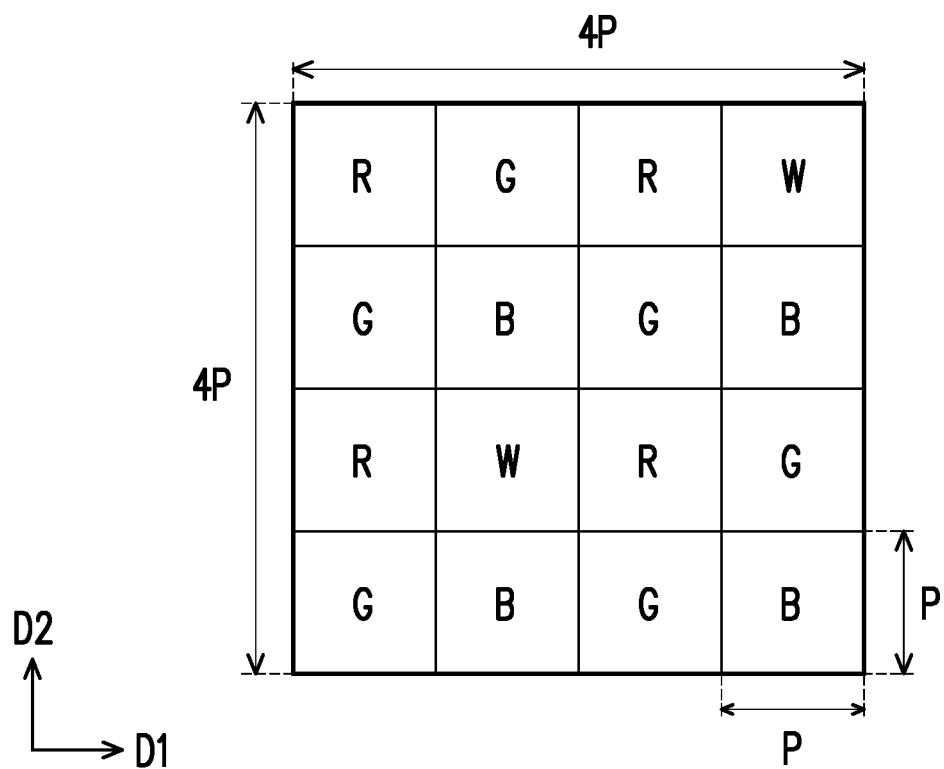
FIG. 6A is a schematic top view of the sub-pixel repeating unit according to an embodiment of the invention.

FIG. 6A illustrates another embodiment of the sub-pixel repeating unit. With reference to FIG. 6A, a sub-pixel repeating unit 610 includes sixteen sub-pixels arranged in an array of four columns and four rows (4×4), which are two first color sub-pixels W, four second color sub-pixels R, six third color sub-pixels G, and four fourth color sub-pixels B. A length of each of the sub-pixels in the first direction D1 is P and a length of each of the sub-pixels in the second direction D2 is P, for example. In other words, in this embodiment, a length of the sub-pixel repeating unit 610 in the first direction D1 is 4 P and a length of the sub-pixel repeating unit 610 in the second direction D2 is 4 P, for example.

In the sub-pixel repeating unit 610 of FIG. 6A, a second column and a fourth column respectively include one first color sub-pixel W, one third color sub-pixel G, and two fourth color sub-pixels B. The two fourth color sub-pixels B in the second column are arranged in alternate rows, and the fourth color sub-pixels B in the fourth column are arranged in alternate rows. The fourth color sub-pixels B in the second column and the fourth column are in the same row while the first color sub-pixels W in the second column and the fourth column are in different rows. A first column and a third column of the sub-pixel repeating unit 610 respectively include two second color sub-pixels R and two third color sub-pixels G. The second color sub-pixels R and the third color sub-pixels G are alternately arranged in the first column. The second color sub-pixels R and the third color sub-pixels G are alternately arranged in the third column.

More specifically, with reference to FIG. 6A, the first column of the sub-pixel repeating unit 610 includes the second color sub-pixel R, the third color sub-pixel G, the second color sub-pixel R, and the third color sub-pixel G in sequence from top to bottom. The second column of the sub-pixel repeating unit 610 includes the third color sub-pixel G, the fourth color sub-pixel B, the first color sub-pixel W, and the fourth color sub-pixel B in sequence from top to bottom. The third column of the sub-pixel repeating unit 610 includes the second color sub-pixel R, the third color sub-pixel G, the second color sub-pixel R, and the third color sub-pixel G in sequence from top to bottom. The fourth column of the sub-pixel repeating unit 610 includes the first color sub-pixel W, the fourth color sub-pixel B, the third color sub-pixel G, and the fourth color sub-pixel B in sequence from top to bottom.

It is worth mentioning that, in the second column and the fourth column of the sub-pixel repeating unit 610, the arrangement sequence of the first color sub-pixels W and the third color sub-pixels G can be adjusted adaptively. Additionally, the second color sub-pixels R and the third color sub-pixels G in the first column and the third column of the sub-pixel repeating unit 610 may be reversed. The second color sub-pixels R and the third color sub-pixels G have the same arrangement sequence in the first column and the third column in this embodiment, but may have different arrangement sequences in other embodiments. Nevertheless, the invention is not limited thereto. In particular, in this embodiment, the second color sub-pixels R and the fourth color sub-pixels B are arranged in alternate columns or alternate rows in the sub-pixel repeating unit 610 to form a checkerboard arrangement.

Figure 6B:
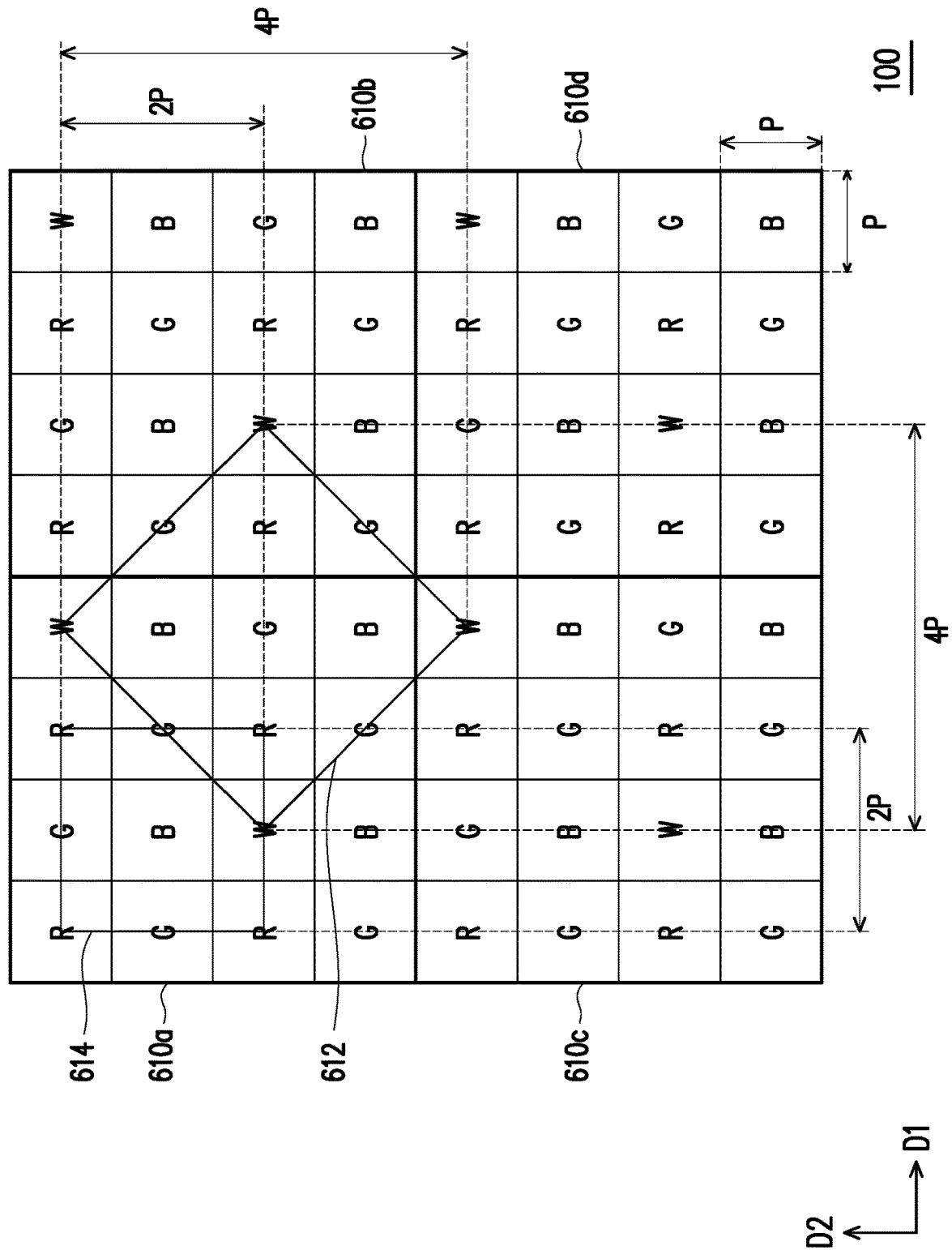
FIG. 6B is a schematic top view of the display panel according to an embodiment of the invention.

Based on the arrangement of the sub-pixel repeating unit 610, how to obtain the first polygon and the second polygon are described in detail hereinafter. FIG. 6B illustrates a region on the display panel 100 that includes four sub-pixel repeating units 610 of FIG. 6A (which are 610a, 610b, 610c, and 610d). Below the first, second, and third sub-pixel repeating units 610a, 610b, and 610c are described to explain details of this embodiment. The first sub-pixel repeating unit 610a is located between the second sub-pixel repeating unit 610b and the third sub-pixel repeating unit 610c. The first, second, and third sub-pixel repeating units 610a, 610b, and 610c are arranged in an L shape.

In this embodiment, two first color sub-pixels W in the first sub-pixel repeating unit 610a, one first color sub-pixel W in the second sub-pixel repeating unit 610b, and one first color sub-pixel W in the third sub-pixel repeating unit 610c form a rhombus, so as to obtain a first polygon 612. In addition, four second color sub-pixels R in the first sub-pixel repeating unit 610a form a rectangle, so as to obtain a second polygon 614.

Specifically, in the embodiment of FIG. 6B, the first polygon 612 is composed of two first color sub-pixels W respectively in the second column and the third row and in the fourth column and the first row of the first sub-pixel repeating unit 610a, one first color sub-pixel W in the second column and the third row of the second sub-pixel repeating unit 610b, and one first color sub-pixel W in the fourth column and the first row of the third sub-pixel repeating unit 610c. Similarly, in this embodiment, the center point of each of the first color sub-pixels W serves as a vertex of the first polygon 612 respectively. With this configuration, the area of the first polygon 612 is 8 $P^2$, obtained through calculation.

Further, the second polygon 614 is composed of four second color sub-pixels R respectively in the first column and the first row, in the first column and the third row, in the third column and the first row, and in the third column and the third row of the first sub-pixel repeating unit 610a. Likewise, the center point of each of the second color sub-pixels R serves as a vertex of the second polygon 614, and through calculation, the area of the second polygon 614 is 4 $P^2$. Based on the above, in this embodiment, the area of the first polygon 612 is twice as large as the area of the second polygon 614.

It is worth mentioning that, in the above embodiments, the first polygon formed by adjacent first color sub-pixels W may be a symmetrical polygon, such as rhombus, rectangle, and symmetrical hexagon. More specifically, the first polygon has a first symmetry axis and a second symmetry axis, which respectively pass through the center of the first polygon. The first symmetry axis and the second symmetry axis are perpendicular to each other and are respectively parallel to the arrangement directions of the sub-pixels on the display panel 100 (i.e. the first direction D1 and the second direction D2). The first color sub-pixels W that form the first polygon may be disposed symmetrically on two sides of the first symmetry axis and on two sides of the second symmetry axis.

Figure 6C:
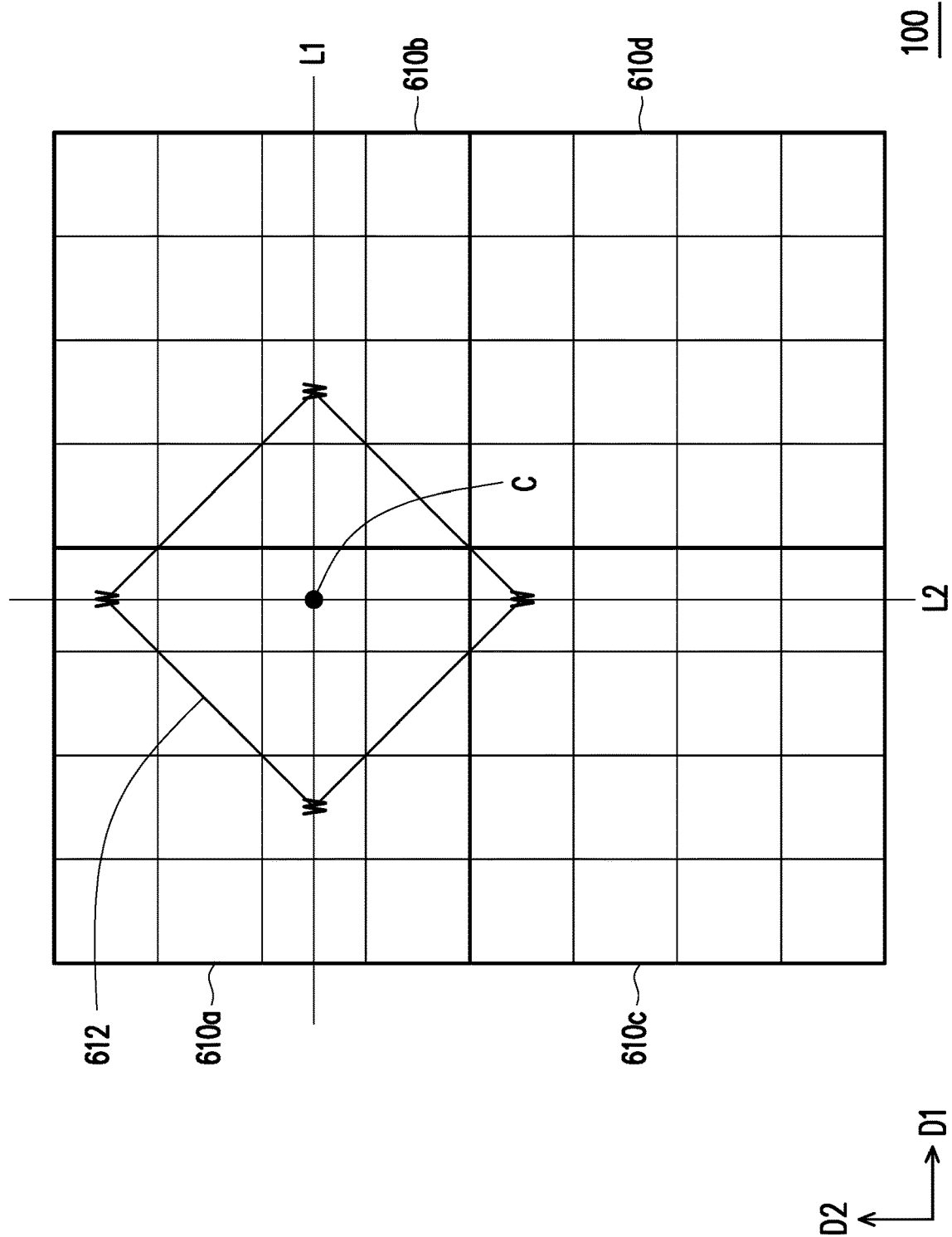
FIG. 6C is a schematic top view of the display panel according to an embodiment of the invention.

The above is explained with reference to the embodiment of FIG. 6C. FIG. 6C is a schematic top view of the display panel according to an embodiment of the invention. It should be noted that the embodiment of FIG. 6C is the same as the embodiment of FIG. 6B, and in order to facilitate the explanation, FIG. 6C merely shows essential elements and reference numerals thereof. With reference to FIG. 6C, a first symmetry axis L1 of the first polygon 612 is a horizontal line that passes through a geometric center C of the first polygon 612, and a second symmetry axis L2 of the first polygon 612 is a vertical line that passes through the geometric center C of the first polygon 612. That is to say, the first color sub-pixel W in the second column and the third row of the first sub-pixel repeating unit 610a is disposed symmetrically with respect to the first color sub-pixel W in the second column and the third row of the second sub-pixel repeating unit 610b based on the second symmetry axis L2, and the first color sub-pixel W in the fourth column and the first row of the first sub-pixel repeating unit 610a is disposed symmetrically with respect to the first color sub-pixel W in the fourth column and the first row of the third sub-pixel repeating unit 610c based on the first symmetry axis L1.

Moreover, since the second color sub-pixels R are arranged in the checkerboard arrangement on the display panel 100 in the above embodiments, the second polygon formed by the adjacent second color sub-pixels R may be a symmetrical quadrangle, such as rhombus and rectangle. Similarly, because the fourth color sub-pixels B are also arranged in the checkerboard arrangement on the display panel 100, the adjacent fourth color sub-pixels B may also form a symmetrical quadrangle.

Furthermore, in the above embodiments, the first color sub-pixels W and the second color sub-pixels R on the display panel 100 are in different columns, and the second color sub-pixels R on the display panel 100 are not adjacent to each other in any column. Similarly, the fourth color sub-pixels B on the display panel 100 are not adjacent to each other in any column either.

Figure 7:
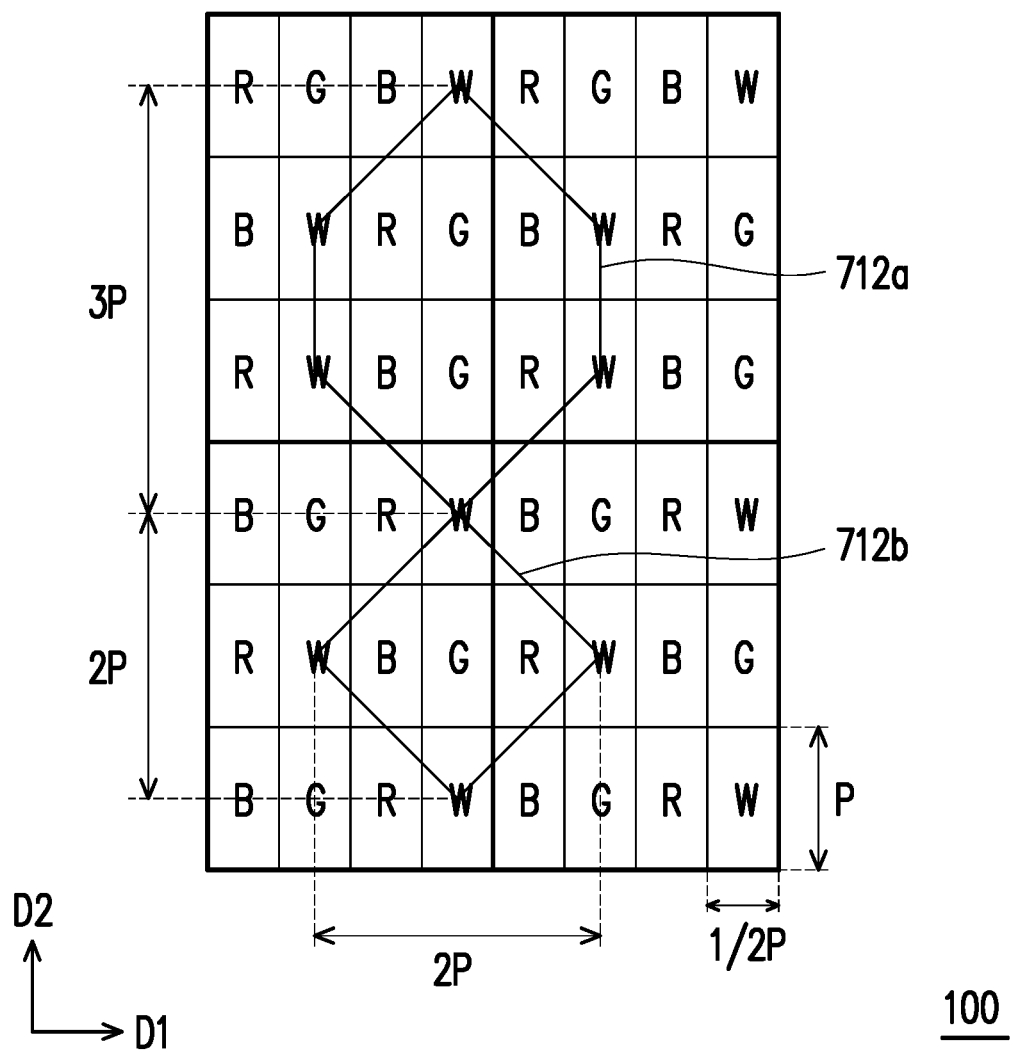
FIG. 7 is a schematic top view of the display panel according to an embodiment of the invention.

In some embodiments, the adjacent first color sub-pixels W on the display panel 100 may form two polygons that have different sizes. The area of the larger polygon may be at least twice the area of the polygon formed by the second color sub-pixels R. Specifically, FIG. 7 is a schematic top view of the display panel according to an embodiment of the invention. According to the arrangement of the sub-pixels shown in FIG. 7, on the display panel 100, the adjacent first color sub-pixels W form two types of first polygons 712a and 712b, wherein the first polygon 712a is a hexagon having an area of 4 $P^2$. The first polygon 712b is a rhombus having an area of 2 $P^2$. In addition, the adjacent second color sub-pixels R (e.g. four second color sub-pixels R in the first column and the third row, in the third column and the second row, in the third column and the fourth row, and in the fifth column and the third row) form a second polygon having an area of 2 $P^2$. Details thereof are similar to the embodiment of FIG. 2B and thus are not repeated hereinafter. Therefore, in this embodiment, the area of the larger first polygon 712a is twice as large as the area of the second polygon formed by the adjacent second color sub-pixels R.

It should be noted that, in some embodiments, the area of the first polygon formed by the adjacent first color sub-pixels W on the display panel 100 may be designed to be larger than double of the area of the second polygon formed by the adjacent second color sub-pixels R according to the requirements. An embodiment is provided below to explain a situation where the area of the first polygon is three times larger than the area of the second polygon.

Figure 8A:
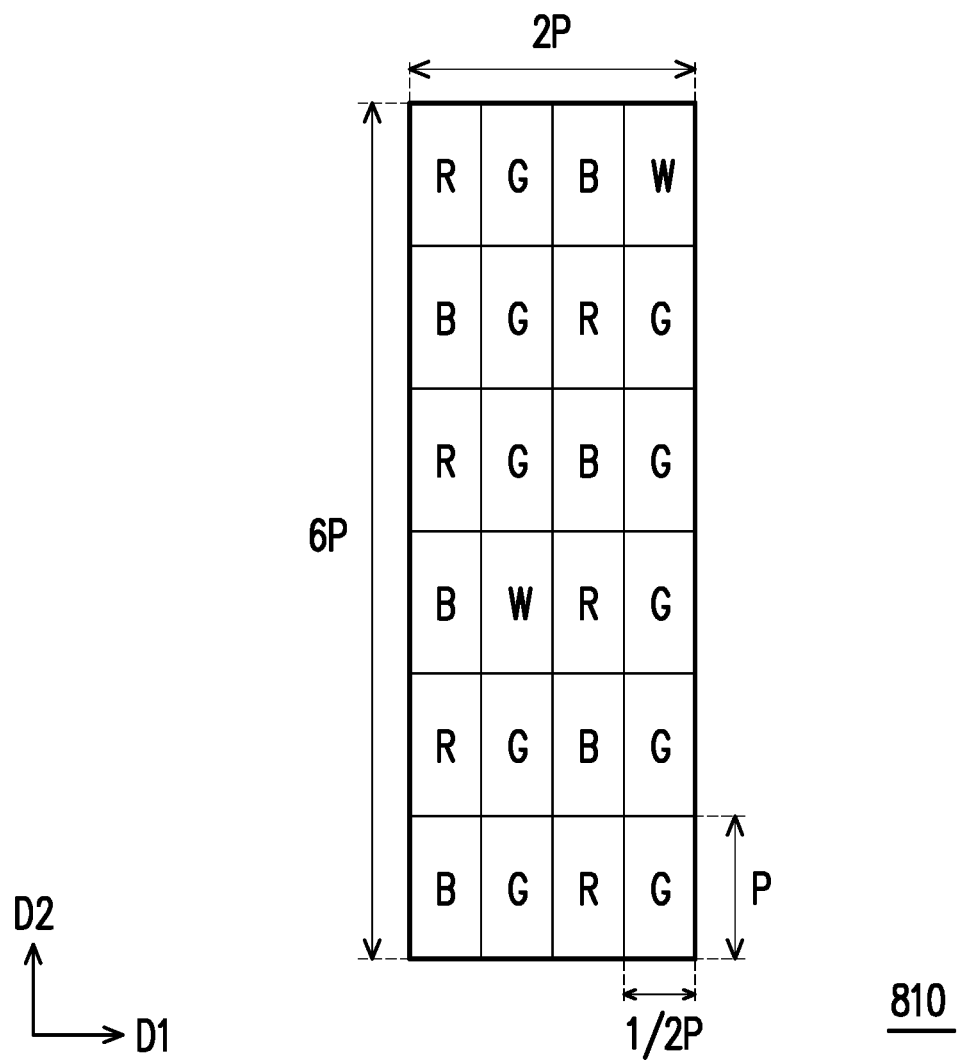
FIG. 8A is a schematic top view of the sub-pixel repeating unit according to an embodiment of the invention.
Figure 8B:
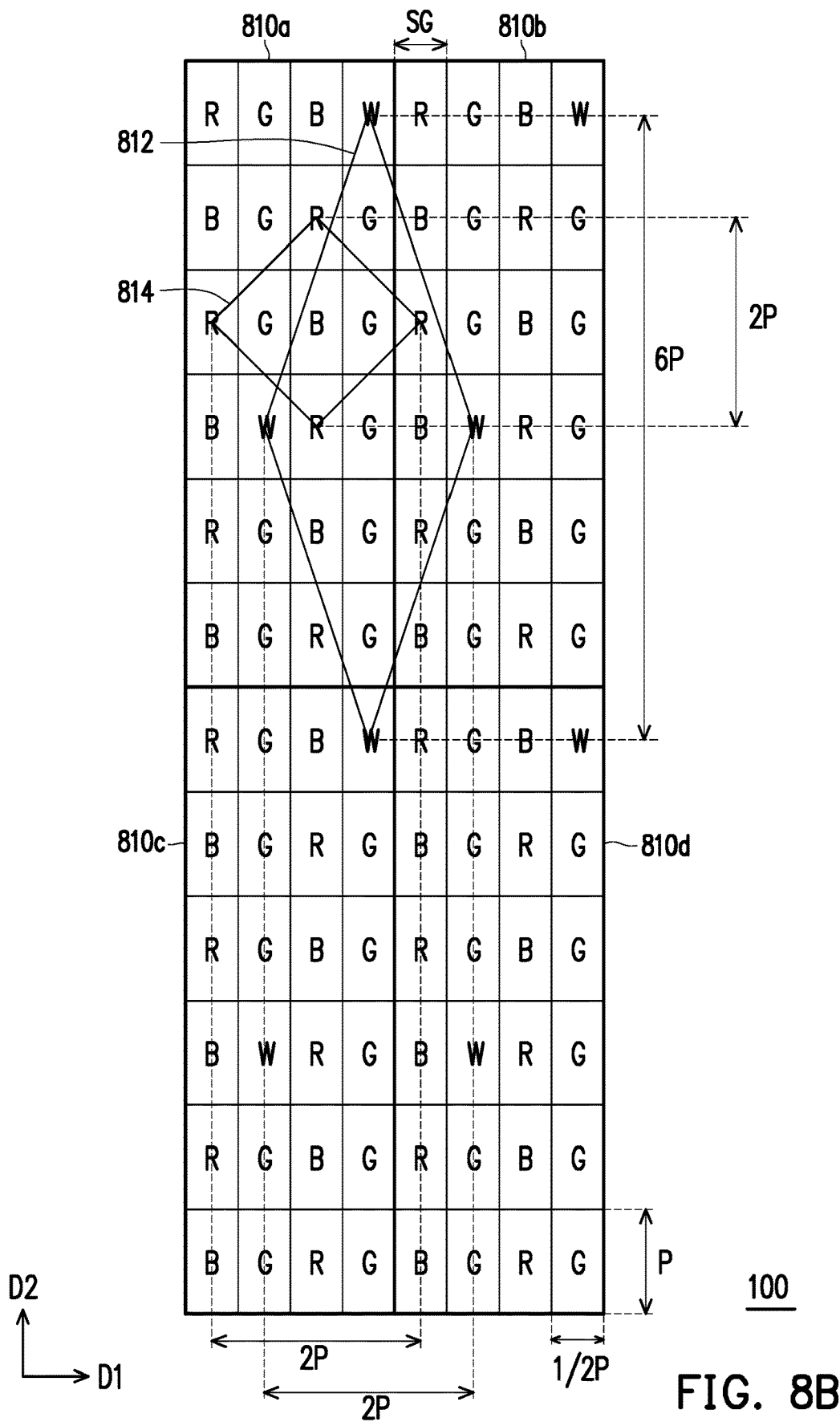
FIG. 8B is a schematic top view of the display panel according to an embodiment of the invention.

With reference to FIG. 8A and FIG. 8B, FIG. 8A is a schematic top view of the sub-pixel repeating unit according to an embodiment of the invention, and FIG. 8B is a schematic top view of the display panel according to an embodiment of the invention, which is formed by repeatedly arranging the sub-pixel repeating unit of FIG. 8A. This embodiment is similar to the aforementioned embodiment. Therefore, details of the same or similar elements are not repeated hereinafter. The arrangement of the sub-pixels in each sub-pixel repeating unit of this embodiment is described below with reference to the respective figures.

First, with reference to FIG. 8A, a sub-pixel repeating unit 810 includes twenty four sub-pixels arranged in an array of four columns and six rows (4×6), which are two first color sub-pixels W, six second color sub-pixels R, ten third color sub-pixels G, and six fourth color sub-pixels B. A length of each of the sub-pixels in the first direction D1 is ½ P and a length of each of the sub-pixels in the second direction D2 is P, for example. In other words, in this embodiment, a length of the sub-pixel repeating unit 810 in the first direction D1 is 2 P and a length of the sub-pixel repeating unit 810 in the second direction D2 is 6 P, for example.

In the sub-pixel repeating unit 810 of FIG. 8A, a second column and a fourth column respectively include one first color sub-pixel W and five third color sub-pixels G, and the two first color sub-pixels W in the second column and the fourth column are in different rows. A first column and a third column of the sub-pixel repeating unit 810 respectively include three second color sub-pixels R and three fourth color sub-pixels B, wherein the second color sub-pixels R and the fourth color sub-pixels B in the first column are alternately arranged, and the second color sub-pixels R and the fourth color sub-pixels B in the third column are alternately arranged. The second color sub-pixels R and the fourth color sub-pixels B are arranged in different sequences in the first column and the third column.

More specifically, with reference to FIG. 8A, in the sub-pixel repeating unit 810, the first column includes the second color sub-pixel R, the fourth color sub-pixel B, the second color sub-pixel R, the fourth color sub-pixel B, the second color sub-pixel R, and the fourth color sub-pixel B in sequence from top to bottom, the second column includes the third color sub-pixel G, the third color sub-pixel G, the third color sub-pixel G, the first color sub-pixel W, the third color sub-pixel G, and the third color sub-pixel G in sequence from top to bottom, the third column includes the fourth color sub-pixel B, the second color sub-pixel R, the fourth color sub-pixel B, the second color sub-pixel R, the fourth color sub-pixel B, and the second color sub-pixel R in sequence from top to bottom, and the fourth column includes the first color sub-pixel W, the third color sub-pixel G, the third color sub-pixel G, the third color sub-pixel G, the third color sub-pixel G, and the third color sub-pixel G in sequence from top to bottom.

It is worth mentioning that, in the second column and the fourth column of the sub-pixel repeating unit 810, the arranging frequency of the first color sub-pixel W and the third color sub-pixels G is 1:5, and the arrangement sequence of the first color sub-pixel W and the third color sub-pixel G can be adjusted adaptively. In the sub-pixel repeating unit 810, the fourth column and the second column may be reversed, and the first column and the third column may also be reversed. However, it should be noted that the invention is not limited to the various arrangements described above. In particular, similar to the aforementioned embodiment, the second color sub-pixels R and the fourth color sub-pixels B are arranged in alternate columns or alternate rows in the sub-pixel repeating unit 810 to form a checkerboard arrangement.

Based on the arrangement of the sub-pixel repeating unit 810, how to obtain the first polygon and the second polygon are described in detail hereinafter. FIG. 8B illustrates a region on the display panel 100 that includes four sub-pixel repeating units 810 of FIG. 8A (which are 810*a*, 810*b*, 810*c*, and 810*d*). Below the first, second, and third sub-pixel repeating units 810*a*, 810*b*, and 810*c* are described to explain details of this embodiment. The first sub-pixel repeating unit 810*a* is located between the second sub-pixel repeating unit 810*b* and the third sub-pixel repeating unit 810*c*. The first, second, and third sub-pixel repeating units 810*a*, 810*b*, and 810*c* are arranged in an L shape.

In this embodiment, two first color sub-pixels W in the first sub-pixel repeating unit 810*a*, one first color sub-pixel W in the second sub-pixel repeating unit 810*b*, and one first color sub-pixel W in the third sub-pixel repeating unit 810*c* form a first rhombus, so as to obtain a first polygon 812. In addition, three second color sub-pixels R in the first sub-pixel repeating unit 810*a* and one second color sub-pixel R in the second sub-pixel repeating unit 810*b* form a second rhombus, so as to obtain a second polygon 814.

Specifically, in the embodiment of FIG. 8B, the first polygon 812 is composed of two first color sub-pixels W respectively in the fourth column and the first row and in the second column and the fourth row of the first sub-pixel repeating unit 810*a*, one first color sub-pixel W in the second column and the fourth row of the second sub-pixel repeating unit 810*b*, and one first color sub-pixel W in the fourth column and the first row of the third sub-pixel repeating unit 810*c*. Likewise, in this embodiment, the center point of each of the first color sub-pixels W serves as a vertex of the first polygon 812 respectively. With this configuration, the area of the first polygon 812 is 6 $P^2$, obtained through calculation.

Further, the second polygon 814 is composed of three second color sub-pixels R respectively in the first column and the third row, in the third column and the second row, and in the third column and the fourth row of the first sub-pixel repeating unit 810*a* and one second color sub-pixel R in the first column and the third row of the second sub-pixel repeating unit 810*b*. Likewise, the center point of each of the second color sub-pixels R serves as a vertex of the second polygon 814, and through calculation, the area of the second polygon 814 is 2 $P^2$. Thus, in this embodiment, the area of the first polygon 812 is three times larger than the area of the second polygon 814.

Moreover, in the embodiment of FIG. 8B, a slit gap SG between two first color sub-pixels W in alternate columns (e.g. two first color sub-pixels W respectively in the fourth column and the first row of the first sub-pixel repeating unit 810*a* and in the second column and the fourth row of the second sub-pixel repeating unit 810*b*) in the first direction D1 is ½ P. As described above, the slit gap SG may determine the resolution applicable to the display panel 100 of this embodiment. Thus, if the slit gap SG is designed to be 42 um or less, the resolution of the display panel 100 needs to be 440 PPI or more.

In terms of resolution, in the embodiment of FIG. 8A and FIG. 8B, the resolution of the first color sub-pixels W on the display panel 100 may be designed as 300 PPI and the resolution of the second color sub-pixels R may be designed as 900 PPI. Thus, the configuration of the first color sub-pixels W on the display panel 100 may be adjusted as appropriate depending on the improvement of excessive enhancement of the brightness that is desired and the technical capability, so as to meet the requirements of high resolution and favorable display effects.

Figure 9:
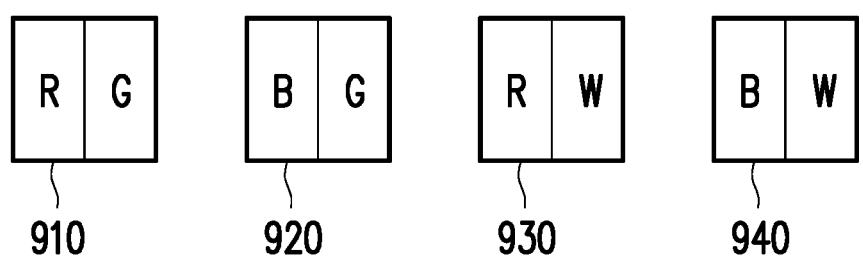
FIG. 9 is a schematic top view of the pixel unit according to an embodiment of the invention.

It should also be mentioned that, in some embodiments, every two color sub-pixels may be deemed as a pixel unit to be combined and arranged to form each repeating unit of the aforementioned embodiment. More specifically, FIG. 9 is a schematic top view of the pixel unit according to an embodiment of the invention. With reference to FIG. 9, a pixel unit 910 includes the second color sub-pixel R and the third color sub-pixel G, a pixel unit 920 includes the fourth color sub-pixel B and the third color sub-pixel G, a pixel unit 930 includes the second color sub-pixel R and the first color sub-pixel W, and a pixel unit 940 includes the fourth color sub-pixel B and the first color sub-pixel W. However, it should be noted that the invention is not limited to the aforementioned combination, which may be adjusted according to the design requirements.

Based on the aforementioned pixel configuration of the pixel units 910, 920, 930, and 940, algorithm processing may be used in this embodiment such that the sub-pixels in the adjacent pixel units can provide desired colors when a driving circuit of the display panel 100 drives each pixel unit. For example, on the display panel 100 of FIG. 2B, the first row may be deemed as including the pixel unit 910, the pixel unit 940, the pixel unit 910, and the pixel unit 940 in sequence from left to right. Thus, if an image signal corresponding to the pixel unit 810 is the fourth color (e.g. blue), in this embodiment, the fourth color sub-pixel B of the pixel unit 940 may be driven to provide the fourth color by a proper design. By doing so, the number of the pixel structures per inch on the display panel 100 is relatively increased to achieve higher resolution.

To conclude the above, the display panel according to the embodiments of the invention adaptively adjusts the configuration of white sub-pixels thereon by designing the arranging frequency of the white sub-pixels in each column, such that the area of the polygon formed by the adjacent white sub-pixels is at least twice as large as the area of the polygon formed by the sub-pixels of other colors. Therefore, the white sub-pixels on the display panel are effectively dispersed to improve abnormal display, such as white border on the edge of the image, caused by excessive enhancement of the brightness of a specific region in the image. The embodiments of the invention further provide a variety of sub-pixel arrangements to be used in combination with the sub-pixel rendering (SPR) technology for achieving high resolution and favorable display effects.

It will be apparent to those skilled in the art that various modifications and variations can be made to the disclosed embodiments without departing from the scope or spirit of the invention. In view of the foregoing, it is intended that the invention covers modifications and variations provided that they fall within the scope of the following claims and their equivalents.

What is claimed is:

1. A display panel, comprising:
a plurality of sub-pixel repeating units repeatedly arranged on the display panel and each comprising first color sub-pixels, second color sub-pixels, third color sub-pixels and fourth color sub-pixels,
wherein, on the display panel, six first color sub-pixels adjacent to each other form a first polygon and four second color sub-pixels adjacent to each other form a second polygon, wherein an area of the first polygon is at least twice as large as an area of the second polygon,
wherein the sub-pixel repeating units are arranged to form an array of four columns and four rows, and the sub-pixel repeating units have identical color sub-pixel arrangements respectively, and
a second column and a fourth column of each of the sub-pixel repeating units respectively comprise two first color sub-pixels and two third color sub-pixels,
wherein the two first color sub-pixels in the second column are arranged to be directly adjacent to each other, the two third color sub-pixels in the second column are arranged to be directly adjacent to each other, the two first color sub-pixels in the fourth column are arranged to be directly adjacent to each other, and the two third color sub-pixels in the fourth column are arranged to be directly adjacent to each other, wherein the two first color sub-pixels and the two third color sub-pixels are arranged in different sequences in the second column and the fourth column.

2. The display panel according to claim 1, wherein the first polygon comprises a first symmetry axis and a second symmetry axis which respectively pass through a center of the first polygon, and the first symmetry axis and the second symmetry axis are perpendicular to each other and respectively parallel to arrangement directions of the color sub-pixels on the display panel, and
wherein the six first color sub-pixels that form the first polygon are disposed symmetrically on two sides of the first symmetry axis and on two sides of the second symmetry axis.

3. The display panel according to claim 1, where
a first column and a third column of each of the sub-pixel repeating units respectively comprise two second color sub-pixels and two fourth color sub-pixels, wherein the second color sub-pixels and the fourth color sub-pixels in the first column are alternately arranged, the second color sub-pixels and the fourth color sub-pixels in the third column are alternately arranged, and the second color sub-pixels and the fourth color sub-pixels are arranged in different sequences in the first column and the third column.

4. The display panel according to claim 3, wherein the sub-pixel repeating units comprise a first sub-pixel repeating unit, a second sub-pixel repeating unit, and a third sub-pixel repeating unit, wherein the first sub-pixel repeating unit is located between the second sub-pixel repeating unit and the third sub-pixel repeating unit, and the first, the second, and the third sub-pixel repeating units are arranged in an L shape, and
wherein three first color sub-pixels in the first sub-pixel repeating unit, two first color sub-pixels in the second sub-pixel repeating unit, and one first color sub-pixel in the third sub-pixel repeating unit form a symmetrical hexagon to obtain the first polygon, and three second color sub-pixels in the first sub-pixel repeating unit and one second color sub-pixel in the second sub-pixel repeating unit form a rhombus to obtain the second polygon.

5. The display panel according to claim 1, wherein the second color sub-pixels on the display panel are not adjacent to each other in any column.

6. The display panel according to claim 1, wherein the first color sub-pixels are white sub-pixels, the second color sub-pixels are red sub-pixels, the third color sub-pixels are green sub-pixels, and the fourth color sub-pixels are blue sub-pixels.

7. The display panel according to claim 1, wherein the first polygon comprises a hexagon, and the second polygon comprises a quadrangle.

* * * * *